US008583671B2

(12) United States Patent
Martin et al.

(10) Patent No.: US 8,583,671 B2
(45) Date of Patent: Nov. 12, 2013

(54) MEDIASET GENERATION SYSTEM

(75) Inventors: Francisco Martin, Corvallis, OR (US); Marc Torrens, Barcelona (ES); Rick Hangartner, Corvallis, OR (US); Guillermo Caudevilla-Laliena, Corvallis, OR (US); David del ser Bartolome, Corvallis, OR (US); Craig Rowley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/432,637

(22) Filed: Apr. 29, 2009
(Under 37 CFR 1.47)

(65) Prior Publication Data
US 2009/0210415 A1 Aug. 20, 2009

Related U.S. Application Data

(60) Division of application No. 11/513,495, filed on Aug. 31, 2006, now abandoned, which is a continuation-in-part of application No. 11/346,818, filed on Feb. 3, 2006, now Pat. No. 7,734,569.

(60) Provisional application No. 60/772,502, filed on Feb. 10, 2006, provisional application No. 60/774,072, filed on Feb. 15, 2006, provisional application No. 60/796,724, filed on May 1, 2006.

(51) Int. Cl.
*G06F 17/30* (2006.01)
*G06F 15/16* (2006.01)
(52) U.S. Cl.
USPC .................. 707/765; 707/916; 709/205
(58) Field of Classification Search
USPC ................... 707/999.107, 913, 916
See application file for complete search history.

(56) References Cited

U.S. PATENT DOCUMENTS 4,996,642 A 2/1991 Hey
5,355,302 A 10/1994 Martin
(Continued)

FOREIGN PATENT DOCUMENTS

EP 1 050 833 8/2000
EP 1 231 788 A1 8/2002
(Continued)

OTHER PUBLICATIONS

Bender, et al., "Newspace: Mass Media and Personal Computing," Proceedings of USENIX, Conference, pp. 329-348 (Summer 1991).
(Continued)

*Primary Examiner* — Usmaan Saeed
*Assistant Examiner* — Brittany N McCue
(74) *Attorney, Agent, or Firm* — Novak Druce Connolly Bove + Quigg LLP

(57) ABSTRACT

Disclosed are various embodiments of systems and methods for generating composite mediasets from mediasets, each comprising media items, associated with a plurality of users. In some embodiments, individual and/or group recommendations are provided for creating a group playlist by aggregating user taste data for a plurality of users in a group. In other embodiments, systems and methods are provided which allow for sharing and playing of a group playlist by users in a group, each of which has a media playback device. Each media item, such as a song, is played from one of the individual user devices for the benefit of all users in the vicinity at the time. Music thus can be "shared" without transferring files potentially in violation of copyrights.

15 Claims, 28 Drawing Sheets

Aggregating individual recommended mediasets into a recommended mediaset suitable for the whole group of users

(56) References Cited

U.S. PATENT DOCUMENTS

| | | |
|---|---|---|
| 5,375,235 A | 12/1994 | Berry |
| 5,464,946 A | 11/1995 | Lewis |
| 5,483,278 A | 1/1996 | Strubbe |
| 5,583,763 A | 12/1996 | Atcheson |
| 5,724,521 A | 3/1998 | Dedrick |
| 5,754,939 A | 5/1998 | Herz |
| 5,758,257 A | 5/1998 | Herz |
| 5,765,144 A | 6/1998 | Larche |
| 5,890,152 A | 3/1999 | Rapaport |
| 5,918,014 A | 6/1999 | Robinson |
| 5,926,624 A | 7/1999 | Katz et al. |
| 5,950,176 A | 9/1999 | Keiser |
| 6,000,044 A | 12/1999 | Chrysos |
| 6,047,311 A | 4/2000 | Ueno |
| 6,112,186 A | 8/2000 | Bergh |
| 6,134,532 A | 10/2000 | Lazarus |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin et al. |
| 6,430,539 B1 | 8/2002 | Lazarus |
| 6,434,621 B1 | 8/2002 | Pezzillo |
| 6,438,579 B1 | 8/2002 | Hosken |
| 6,487,539 B1 | 11/2002 | Aggarwal |
| 6,526,411 B1 | 2/2003 | Ward |
| 6,532,469 B1 | 3/2003 | Feldman |
| 6,577,716 B1 | 6/2003 | Minter |
| 6,587,127 B1 | 7/2003 | Leeke |
| 6,615,208 B1 | 9/2003 | Behrens |
| 6,647,371 B2 | 11/2003 | Shinohara |
| 6,687,696 B2 | 2/2004 | Hofmann |
| 6,690,918 B2 | 2/2004 | Evans |
| 6,704,576 B1 * | 3/2004 | Brachman et al. ............ 455/503 |
| 6,727,914 B1 | 4/2004 | Gutta |
| 6,748,395 B1 | 6/2004 | Picker |
| 6,751,574 B2 | 6/2004 | Shinohara |
| 6,785,688 B2 | 8/2004 | Abajian |
| 6,842,761 B2 | 1/2005 | Diamond |
| 6,850,252 B1 | 2/2005 | Hoffberg |
| 6,914,891 B2 | 7/2005 | Ha |
| 6,931,454 B2 | 8/2005 | Deshpande |
| 6,933,433 B1 * | 8/2005 | Porteus et al. ................. 84/615 |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke |
| 6,993,532 B1 | 1/2006 | Platt |
| 7,013,238 B1 * | 3/2006 | Weare ............................ 702/182 |
| 7,020,637 B2 | 3/2006 | Bratton |
| 7,021,836 B2 | 4/2006 | Anderson |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos |
| 7,096,234 B2 | 8/2006 | Plastina |
| 7,111,240 B2 | 9/2006 | Crow |
| 7,113,917 B2 | 9/2006 | Jacobi |
| 7,113,999 B2 * | 9/2006 | Pestoni et al. ................ 709/231 |
| 7,120,619 B2 | 10/2006 | Drucker |
| 7,127,143 B2 | 10/2006 | Elkins |
| 7,136,866 B2 | 11/2006 | Springer, Jr. |
| 7,139,723 B2 | 11/2006 | Conkwright |
| 7,174,126 B2 | 2/2007 | McElhatten |
| 7,194,421 B2 | 3/2007 | Conkwright |
| 7,196,258 B2 | 3/2007 | Platt |
| 7,197,472 B2 | 3/2007 | Conkwright |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,457,852 B2 | 11/2008 | O'Rourke |
| 7,457,862 B2 | 11/2008 | Hepworth |
| 7,478,323 B2 | 1/2009 | Dowdy |
| 7,487,107 B2 | 2/2009 | Blanchard et al. |
| 7,490,775 B2 * | 2/2009 | Biderman ................ 235/472.01 |
| 7,493,572 B2 | 2/2009 | Card |
| 7,499,630 B2 | 3/2009 | Koch |
| 7,505,959 B2 | 3/2009 | Kaiser |
| 7,546,254 B2 | 6/2009 | Bednarek |
| 7,568,213 B2 | 7/2009 | Carhart |
| 7,571,183 B2 | 8/2009 | Renshaw |
| 7,574,422 B2 | 8/2009 | Guan |
| 7,574,513 B2 | 8/2009 | Dunning |
| 7,580,932 B2 | 8/2009 | Plastina |
| 7,599,950 B2 | 10/2009 | Walther |
| 7,644,077 B2 | 1/2010 | Picker |
| 7,650,570 B2 | 1/2010 | Torrens et al. |
| 7,657,224 B2 * | 2/2010 | Goldberg et al. ............ 455/3.06 |
| 7,680,959 B2 | 3/2010 | Svendsen |
| 7,681,301 B2 | 3/2010 | Rogers |
| 7,707,603 B2 | 4/2010 | Abanami |
| 7,720,871 B2 | 5/2010 | Rogers |
| 7,725,494 B2 | 5/2010 | Rogers |
| 7,734,569 B2 | 6/2010 | Martin |
| 7,743,009 B2 | 6/2010 | Hangartner |
| 7,797,321 B2 | 9/2010 | Martin |
| 7,797,446 B2 | 9/2010 | Heller et al. |
| 7,826,444 B2 | 11/2010 | Irvin |
| 7,853,712 B2 | 12/2010 | Amidon |
| 7,875,788 B2 | 1/2011 | Benyamin |
| 7,889,724 B2 | 2/2011 | Irvin |
| 2001/0007099 A1 | 7/2001 | Rau |
| 2001/0056434 A1 | 12/2001 | Kaplan |
| 2002/0002899 A1 | 1/2002 | Gjerdingen |
| 2002/0042912 A1 | 4/2002 | Iijima |
| 2002/0059094 A1 | 5/2002 | Hosea |
| 2002/0082901 A1 | 6/2002 | Dunning |
| 2002/0152117 A1 | 10/2002 | Cristofalo |
| 2002/0178223 A1 | 11/2002 | Bushkin |
| 2002/0178276 A1 | 11/2002 | McCartney |
| 2002/0194215 A1 | 12/2002 | Cantrell |
| 2003/0022953 A1 | 1/2003 | Zampini et al. |
| 2003/0033321 A1 | 2/2003 | Schrempp |
| 2003/0055689 A1 | 3/2003 | Block |
| 2003/0120630 A1 | 6/2003 | Tunkelang |
| 2003/0212710 A1 | 11/2003 | Guy |
| 2003/0229537 A1 | 12/2003 | Dunning |
| 2004/0002993 A1 | 1/2004 | Toussaint |
| 2004/0003392 A1 | 1/2004 | Trajkovic et al. |
| 2004/0068552 A1 | 4/2004 | Kotz |
| 2004/0070538 A1 | 4/2004 | Horie et al. |
| 2004/0073924 A1 | 4/2004 | Pendakur |
| 2004/0128286 A1 | 7/2004 | Yasushi |
| 2004/0139064 A1 | 7/2004 | Chevallier |
| 2004/0148424 A1 | 7/2004 | Berkson |
| 2004/0158860 A1 | 8/2004 | Crow |
| 2004/0162738 A1 | 8/2004 | Sanders |
| 2004/0194128 A1 | 9/2004 | McIntyre |
| 2004/0247715 A1 | 12/2004 | Kuo |
| 2004/0263337 A1 | 12/2004 | Terauchi et al. |
| 2005/0021470 A1 | 1/2005 | Martin |
| 2005/0060350 A1 | 3/2005 | Baum |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan |
| 2005/0131752 A1 | 6/2005 | Gracie |
| 2005/0141709 A1 | 6/2005 | Bratton |
| 2005/0154608 A1 | 7/2005 | Paulson |
| 2005/0160458 A1 | 7/2005 | Baumgartner |
| 2005/0193014 A1 | 9/2005 | Prince |
| 2005/0193054 A1 | 9/2005 | Wilson |
| 2005/0195696 A1 | 9/2005 | Rekimoto |
| 2005/0203807 A1 | 9/2005 | Bezos |

(56) References Cited

U.S. PATENT DOCUMENTS

| | | |
|---|---|---|
| 2005/0210009 A1 | 9/2005 | Tran |
| 2005/0210101 A1 | 9/2005 | Janik |
| 2005/0216859 A1 | 9/2005 | Paek |
| 2005/0222989 A1 | 10/2005 | Haveliwala |
| 2005/0223039 A1 | 10/2005 | Kim |
| 2005/0234891 A1 | 10/2005 | Walther |
| 2005/0235811 A1 | 10/2005 | Dukane |
| 2005/0251440 A1 | 11/2005 | Bednarek |
| 2005/0256867 A1 | 11/2005 | Walther |
| 2005/0276570 A1 | 12/2005 | Reed |
| 2006/0015571 A1 | 1/2006 | Fukuda et al. |
| 2006/0015904 A1 | 1/2006 | Marcus |
| 2006/0018208 A1 | 1/2006 | Nathan et al. |
| 2006/0018209 A1 | 1/2006 | Drakoulis et al. |
| 2006/0020062 A1 | 1/2006 | Bloom |
| 2006/0020662 A1 | 1/2006 | Robinson |
| 2006/0026263 A1 | 2/2006 | Raghavan |
| 2006/0062094 A1 | 3/2006 | Nathan et al. |
| 2006/0067296 A1 | 3/2006 | Bershad |
| 2006/0074750 A1 | 4/2006 | Clark et al. |
| 2006/0080251 A1 | 4/2006 | Fried |
| 2006/0080356 A1 | 4/2006 | Burges |
| 2006/0091203 A1 | 5/2006 | Bakker |
| 2006/0100978 A1 | 5/2006 | Heller |
| 2006/0123052 A1 | 6/2006 | Robbin |
| 2006/0136344 A1 | 6/2006 | Jones |
| 2006/0143236 A1 | 6/2006 | Wu |
| 2006/0156239 A1 | 7/2006 | Jobs et al. |
| 2006/0165571 A1 | 7/2006 | Seon |
| 2006/0168616 A1 | 7/2006 | Candelore |
| 2006/0173910 A1 | 8/2006 | McLaughlin |
| 2006/0173916 A1 | 8/2006 | Verbeck Sibley |
| 2006/0174008 A1 | 8/2006 | Abanami |
| 2006/0195462 A1 | 8/2006 | Rogers |
| 2006/0195512 A1 | 8/2006 | Rogers et al. |
| 2006/0195515 A1 | 8/2006 | Beaupre |
| 2006/0195516 A1 | 8/2006 | Beaupre |
| 2006/0195521 A1 | 8/2006 | New |
| 2006/0195789 A1 | 8/2006 | Rogers |
| 2006/0195790 A1 | 8/2006 | Beaupre |
| 2006/0206478 A1 | 9/2006 | Glaser |
| 2006/0253874 A1 | 11/2006 | Stark |
| 2006/0265421 A1* | 11/2006 | Ranasinghe et al. ....... 707/104.1 |
| 2006/0277098 A1 | 12/2006 | Chung |
| 2006/0282304 A1 | 12/2006 | Bedard et al. |
| 2006/0282311 A1 | 12/2006 | Jiang |
| 2006/0288044 A1 | 12/2006 | Kashiwagi |
| 2006/0288367 A1 | 12/2006 | Swix |
| 2007/0016507 A1 | 1/2007 | Tzara |
| 2007/0043829 A1 | 2/2007 | Dua |
| 2007/0073596 A1 | 3/2007 | Alexander |
| 2007/0100690 A1 | 5/2007 | Hopkins |
| 2007/0101373 A1* | 5/2007 | Bodlanender et al. .......... 725/86 |
| 2007/0118546 A1 | 5/2007 | Acharya |
| 2007/0136264 A1 | 6/2007 | Tran |
| 2007/0156677 A1 | 7/2007 | Szabo |
| 2007/0161402 A1* | 7/2007 | Ng. et al. ................. 455/554.2 |
| 2007/0162546 A1 | 7/2007 | McLaughlin |
| 2007/0203790 A1 | 8/2007 | Torrens |
| 2007/0244880 A1 | 10/2007 | Martin |
| 2007/0250429 A1 | 10/2007 | Walser |
| 2007/0250761 A1 | 10/2007 | Bradley |
| 2007/0265979 A1 | 11/2007 | Hangartner |
| 2007/0271286 A1 | 11/2007 | Purang |
| 2007/0271287 A1 | 11/2007 | Acharya et al. |
| 2007/0294096 A1 | 12/2007 | Randall |
| 2008/0004948 A1 | 1/2008 | Flake |
| 2008/0004990 A1 | 1/2008 | Flake |
| 2008/0021851 A1 | 1/2008 | Alcalde |
| 2008/0027881 A1 | 1/2008 | Bisse |
| 2008/0040326 A1 | 2/2008 | Chang et al. |
| 2008/0046317 A1 | 2/2008 | Christianson |
| 2008/0065659 A1 | 3/2008 | Watanabe et al. |
| 2008/0077264 A1 | 3/2008 | Irvin |
| 2008/0082467 A1 | 4/2008 | Meijer |
| 2008/0109378 A1 | 5/2008 | Papadimitriou |
| 2008/0133601 A1 | 6/2008 | Cervera |
| 2008/0154942 A1 | 6/2008 | Tsai et al. |
| 2008/0155057 A1* | 6/2008 | Khedouri et al. ............. 709/217 |
| 2008/0155588 A1 | 6/2008 | Roberts |
| 2008/0195438 A1 | 8/2008 | Manfredi |
| 2008/0215173 A1 | 9/2008 | Hicken |
| 2008/0220855 A1 | 9/2008 | Chen |
| 2008/0256106 A1 | 10/2008 | Whitman |
| 2008/0270221 A1 | 10/2008 | Clemens |
| 2009/0006353 A1 | 1/2009 | Vignoli |
| 2009/0024504 A1 | 1/2009 | Lerman |
| 2009/0024510 A1 | 1/2009 | Chen |
| 2009/0048957 A1 | 2/2009 | Celano |
| 2009/0070267 A9 | 3/2009 | Hangartner |
| 2009/0073174 A1 | 3/2009 | Berg |
| 2009/0076939 A1 | 3/2009 | Berg |
| 2009/0076974 A1 | 3/2009 | Berg |
| 2009/0083307 A1 | 3/2009 | Cervera |
| 2009/0089222 A1 | 4/2009 | Ferreira |
| 2009/0106085 A1 | 4/2009 | Raimbeault |
| 2009/0164641 A1 | 6/2009 | Rogers |
| 2009/0210415 A1 | 8/2009 | Martin et al. |
| 2009/0276368 A1 | 11/2009 | Martin |
| 2010/0161595 A1 | 6/2010 | Martin |
| 2010/0169328 A1 | 7/2010 | Hangartner |
| 2011/0119127 A1 | 5/2011 | Hangartner |

FOREIGN PATENT DOCUMENTS

| | | |
|---|---|---|
| EP | 1420388 A1 | 5/2004 |
| EP | 1 548 741 A1 | 6/2005 |
| JP | 11052965 | 2/1999 |
| JP | 2002108351 | 4/2002 |
| JP | 2002-320203 | 10/2002 |
| JP | 2003255958 | 10/2003 |
| JP | 2004-221999 | 8/2004 |
| JP | 2005-027337 | 1/2005 |
| KR | 2002025579 A | 4/2002 |
| WO | WO 03/036541 A1 | 5/2003 |
| WO | WO 03/051051 A1 | 6/2003 |
| WO | WO2004070538 | 8/2004 |
| WO | WO 2004/107757 | 12/2004 |
| WO | WO 2005/013114 A1 | 2/2005 |
| WO | WO 2005/115107 A2 | 12/2005 |
| WO | WO2006052837 | 5/2006 |
| WO | WO 2006/075032 | 7/2006 |
| WO | WO 2006/114451 | 11/2006 |
| WO | WO 2007/038806 A3 | 4/2007 |
| WO | 2007134193 A3 | 5/2007 |
| WO | 2007075622 A2 | 7/2007 |
| WO | 2007092053 A1 | 8/2007 |
| WO | WO 2009/149046 A1 | 12/2009 |

OTHER PUBLICATIONS

Jon Orwant, "Appraising the User of User Models: Doppelgänger's Interface," in: A. Kobsa and D. Litman (eds.), Proceeding of the 4th International Conference on User Modeling (1994).

John Thompson, "A Graphic Representation of Interaction With the NEXIS News Database," MIT Thesis (May 1983).

Lippman, et al., "News and Movies in the 50 Megabit Living Room," IEEE/IEICE, Global Telecommunications Conference, pp. 1976-1981 (Nov. 15, 1987).

Lie, "The Electronic Broadsheet—All the News That Fits the Display," MIT Master's Thesis, pp. 1-96 (Jun. 1991).

Jonathan L. Orwant, "Doppelgänger: A User Modeling System," MIT Bachelor's Thesis (Jun. 1991).

"Lessons from LyricTimeTM: A Prototype Multimedia System" 4th IEEE ComSoc International Workshop on Multimedia Communications (Apr. 1992).

Delivering Interactive Multimedia Documents over Networks; Shoshana Loeb; IEEE Communications Magazine; May 1992; 8 pages.

"Communications of the ACM" Dec. 1992, vol. 35, No. 12 at pp. 26-28 (Introduction to special issue regarding Workshop on High Performance Information Filtering, Morristown, N. J. Nov. 1991).

(56) References Cited

OTHER PUBLICATIONS

Belkins, et al., "Information Filtering and Information Retrieval: Two Sides of the Same Coin?", Communications of the ACM (Dec. 1992).
Architecting Personalized Delivery of Multimedia Information,: Communications of the ACM (Dec. 1992).
Jonathan L. Orwant, "Doppelgänger Goes to School: Machine Learning for User Modeling," MIT Master of Science Thesis (Sep. 1993).
Bender, "Twenty Years of Personalization: All about the Daily Me," Educause Review (Sep./Oct. 2002).
PCT/ES2005/00003 Written Opinion of the International Searching Authority Report dated Jun. 10, 2005.
PCT/ES2005/00003 Written Opinion of the International Preliminary Examining Authority dated Mar. 19, 2007.
PCT/ES2005/00003 International Preliminary Report on Patentability (Ch II) Report dated May 22, 2007.
PCT/ES2005/000213 Written Opinion of the International Searching Authority dated Jan. 12, 2006.
PCT/ES2005/000213 International Preliminary Report on Patentability (Ch II) Report Dated Nov. 15, 2007.
Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document—18 pages.
ShopSmart: Product Recommendations through Technical Specifications and User Reviews; Alexander Yates et al. Temple University; CIKM; Oct. 26-30, 2008, Napa Valley, CA, USA; 2 pages.
PCT/US09/68604 International Search Report and Written Opinion of the International Searching Authority; dated Feb. 17, 2010.
Augmenting the Social Space of an Academic Conference; McCarthy, et al. Information School, University of Washington and Department of Computer Science and Engineering, University of Minnesota; pp. 1-10; Nov. 6-10, 2004.
Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2008. ACM Press.
Carlson et al. "Internet Banking Market Developments and Regulatory Issues in the New Economy; What Changed, and the Challenges for Economic Policy . . . "; May 2001; http://www.occ.gov/netbank/SGEC2000.pdf.
Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, USA, 2007. ACM Press.
Dean, J. and Ghemawat, S. "MapReduce: Simplied Data Processing on Large Clusters." Commun. ACM, 51(1):107-113, 2008.
Dempster, Y., Laird, N., and Rubin, D. "Maximum Likelihood from Incomplete DAta via the EM Algorithm". Jour. of the Royal Stat. Soc., Ser. B., 39:1047-1053, 1977.
Deshpande, Mukund et al., "Item-Based Top-N Recommendation Algoriths," ACM Transactions on Information Systems, 22:1 (Jan. 2004), pp. 143-177.
Hofmann, T. "Latent Semantic Models for Collaborative Filtering". ACM Transactions on Information Systems, 22:89-115, 2004.
Hofmann, T. "Unsupervised Learning by Probabilistic Latent Semantic Analysis". Mach. Learn., 42:177-196, 2001.
Industry Standard, The, Help FAQs for Standard Prediction Market, http://www.thestandard.com/help, downloaded Jun. 29, 2009.
Indyk, P. And Matousek, J. "Low-Distortion Embeddings of Finite Metric Spaces". In Handbook of Discrete and Computational Geometry, pp. 177-196. CRC Press, 2004.
International Search Report PCT/US2009/051233; Sep. 4, 2009; Strands, Inc.
IP City, Integrated Project on Interaction and Presence on Urban Environments—Demonstrators on Large-Scale Events Applications; ipcity.eu; Giulio Jacucci, John Evans, Tommi Ilmonen; pp. 1-37; Feb. 9, 2007.
Lazar, N.A.; Bayesian Empirical Likelihood; Technical Report, Carnegi Mellon University, Department of Statistics, 2000; 26 pages.
MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.
Pachet, Francois, A Taxonomy of Musical Genres, Content-Based Multimedia Information Access Conference (RIAO), Paris, Apr. 2000, 8 pages.
PCT/US07/068708; Filed May 10, 2007; International Search Report and Written Opinion; WO 2007/134193; Dec. 7, 2007.
PCT/US09/42002; Filed Apr. 28, 2009; International Search Report and Written Opinion; Jun. 2009.
PCT/US09/45911; Filed Jun. 2, 2009; International Search Report and Written Opinion.
PCT/US2006/003795; International Search Report and Written Opinion of International Application, dated May 28, 2008.
PCT/US2006/034218; USPTO Search Authority; PCT International Search Report; Feb. 9, 2007.
PCT/US2006/048330; International Bureau; PCT Search Report and Written Opinion; Mar. 20, 2008; 10 pages.
PCT/US2007/068708; International Search Report; May 10, 2007.
PCT/US2007/09/45725; International Search Report_WO; Jul. 15, 2009.
Scihira, I. "A Characterization of Singular Graphs". Electronic Journal of Linear Algebra, 16:451-462, 2007.
Smart Computing, "The Scoop on File-Sharing Services," Dec. 2000, vol. 11, Issue 12; pp. 30-33 in printed issue. Available at www.smancomputing.com/editorial/article.asp?article=articles%2F2000%Fs1112%2F08s12.asp.
The Trustees of Indiana University, Variations2, The Indiana University Digital Music Library, http://dml.indiana.edu/, last updated May 11, 2005, 1 page.
Toward University Mobile Interaction for Shared Displays; Tim Paek, et al.; Microsoft Research, Redmond, WA; pp. 1-4; Nov. 6-10, 2004.
Wolfers, Justin and Zitzewitz, Eric, Prediction Markets, Journal of Economic Perspectives, Spring 2004, pp. 107-126, vol. 18, No. 2.
Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.
PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.
Toward alernative metrics of journal impact: a comparison of download and citation data, Johan Bollen, Herbert Van de Sompel, Joan Smith, Rick Luce, Google.com, 2005, pp. 1-2.
Apple: iTunes 4.2 User Guide for Windows; Dec. 2003; retrieved from the internet: URL: http://www2.austin.cc.tx.us/tcm/projects/itunes.pdf; pp. 10, 17-19.
Incremental tensor analysis: theory and applications, Jimeng Sun, Dacheng Tao, Spiros Papadimitriou, Philip Yu, Christos Faloutsos, ACM, Oct. 2008, pp. 1-37.
PCT/US2006/004257 European Search Report Oct. 23, 2009.
IEEE, no matched results, Nov. 11, 2009, 1 page.
Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/viewdoc/download?doi=10.1.1.131.2933&rep=rep1&type=pdf].
Tom Bunzel, "Easy Digital Music," QUE Publisher, Aug. 18, 2004, Chapters 5 and 8.
"New Music Recommendation System is Based on FOAF Personal Profiling," www.masternewmedia.org/music_recommendation/music_recommendation_system_FOAF, Oct. 1, 2005.
"Social Networking Meets Music Listening: Mecora Launches Radio 2.0," www.masternewmedia.org/news/2006/04/13/social_networking_meets_music_listening.htm, Apr. 13, 2006.
Co-Construction of Hybrid Spaces; Asa Rudstrom; A Dissertation submitted to the University of Stockholm in partial fulfillment of the requirements for the Degree of Doctor of Philosophy; Department of

(56) References Cited

OTHER PUBLICATIONS

Computer and Systems Sciences Stockholm University and Royal Institute of Technology; pp. 1-69; Nov. 2005. Retrieved from the internet: <URL: http://www.sics.se/~asa/Thesis/CoverPaper.pdf> entire document.
Canada—Examiner's Report for App. No. 2713507 mailed on Sep. 21, 2011.
UK Search Examination Report, App. No. GB1014954.0, mailed Dec. 16, 2010.
PCT/US06/38769; International Search Report; Mar. 25, 2008.
"Final Office Action dated Jan. 1, 2012", U.S. Appl. No. 12/242,728 (15 pages).
"Final Office Action dated Nov. 10, 2011", U.S. Appl. No. 12/242,768 (10 pages).
"Non-Final Office Action dated Feb. 16, 2012", U.S. Appl. No. 12/242,758.
"Non-Final Office Action dated Feb. 9, 2012", U.S. Appl. No. 12/646,916 (13 pages).
"Non-Final Office Action dated Jan. 9, 2012", U.S. Appl. No. 12/242,735 (12 pages).
"Treemap", Treemap, University of Maryland, http://www.cs.umd.edu/hcil/treemap/, last udpated Aug. 5, 2003, 4 pages.
Connell, Lain et al., "Ontological Sketch Models: Highlighting User-System Misfits", Connell, Iain et al., Ontological Sketch Models: Highlighting User-System Misfits, in P. Palanque, E. O'Neill and P. Johnson, editors, Proceedings of Human Computer Interaction (HCI) Bath, England, Sep. 2003, London Springer, pp. 1-16.
Logan, Beth, "A Music Similarity Function Based on Signal Analysis", Logan, Beth et al., A Music Similarity Function Based on Signal Analysis, IEEE International Conference on Multimedia and Expo (ICME), Tokyo, Japan, Aug. 2001, IEEE Press, pp. 952-955.
Logan, Beth, "Content-Based Playlist Generation: Exploratory Experiments", Logan, Beth, Content-Based Playlist Generation: Exploratory Experiments, The International Conference on Music Information Retrieval and Related Activities (ISMIR 2002), Paris, France, Oct. 2002,2 pages.
Maidin, Donncha et al., "The Best of Two Worlds: Retrieving and Browsing", Maidin, Donncha 0 et al., The Best of Two Worlds: Retrieving and Browsing, Proceedings of the COST G-6 Conference on Digital Audio Effects (DAFX-OO), Verona, Italy, Dec. 7-9, 2000,4 pages.
Australia Examiner's 1st Report on patent application No. 2010212503 mailed Jun. 27, 2011.
EP Search, App. No. EP 10175868.8.
"PCT/US 10/47955 International Search Report", PCT/US 10/47955 International Search Report mailed Nov. 8, 2010.
Notess, Mark et al., Notess, Mark et al., Variations2: Toward Visual Interface for Digital Music Libraries, Second International Workshop on Visual Interfaces to Digital Libraries, 2002, 6 pages.
Pampalk, Elias et al., "Content-based Organization and Visualization of Music Archives", Pampalk, Elias et al., Content-based Organization and Visualization of Music Archives, ACM Multimedia, Juan les Pins, France, Dec. 2002, pp. 570-579.
Pauws, Steffen et al., "PATS: Realization and User Evaluation of an Automatic Playlist Generator", Pauws, Steffen et al., PATS: Realization and User Evaluation of an Automatic Playlist Generator, The International Conferences on Music Information Retrieval and Related Activities (ISMIR 2002), Paris, France, Oct. 2002,9 pages.
Rauber, Andreas et al., "The SOM-enhanced JukeBox: Organization and visualization of Music Collections Based on Perceptual Models", Rauber, Andreas et al., The SOM-enhanced JukeBox: Organization and Visualization of Music Collections Based on Perceptual Models, Journal of New Music Research, vol. 32, Nov. 2, 2003, pp. 193-210.
Shneiderman, Ben, "Tree Visualization with Tree-Maps: 2-d Space-Filling Approach", Shneiderman, Ben, Tree Visualization with Tree-Maps: 2-d Space-Filling Approach, ACM Transactions on Graphics, vol. 11, No. 1, Jan. 1992, pp. 92-99.
Shneiderman, Ben, "Treemaps for Space-Contrained Visualization of Hierarchies", Shneiderman, Ben, Treempas for Space-Contrained Visualization of Hierarchies, http://www.sc.umd.edu/heil/treemap-history, last updated Apr. 28, 2006, 16 pages.
Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.
"New Music Recommendation System is Based on FOAF Personal Profiling", www.masternewmedia.org/music_recommendation/music_recommendation_system_FOAF, Oct. 1, 2005.
"Social Networking Meets Music Listening: Mecora Launches Radio 2.0", www.masternewmedia.org/news/2006/04/13/social_networking_meets_music_listening.htm, Apr. 13, 2006.
Rudstrom, Asa, "Co-Construction of Hybrid Spaces", Asa Rudstrom; A Dissertation submitted to the University of Stockholm in partial fulfillment of the requirements for the Degree of Doctor of Philosophy; Department of Computer and Systems Sciences Stockholm University and, Nov. 2005, 1-69.
Platt, John C. et al., "Learning a Gaussian Process Prior for Automatically Generating Music Playlists", Microsoft Corporation {platt, cburgess, sswenson, chriswea}@microsoft.com, alcez@cs.berkeley.edu, 2002; pp. 1-9.
Platt, John S., "Fasting Embedding of Sparse Music Similarity Graphs", Microsoft Corporation, {jplatt@microsoft.com}; 2004.
"TouchTunes Signs License Agreement for BMI Music in Digital Jukeboxes", www.bmi.com/news/200403/20040324b.asp, Web Page, BMI™ Figures Don't Lie, Mar. 24, 2004, Touch Tunes Signs License Agreement for BMI Music in Digital Jukeboxes, Mar. 24, 2004.
"Digital Music Sales Triple to $1.1 Billion in 2005", Maintenance Fees, Feb. 24, 2006, Axcessnews.com, available online www.axcessnews.com/modules/wfsection/article.php?articleid=8327, last viewed Feb. 24, 2006.
Alvear, Jose, "Risk-Free Trial Streaming Media Delivery Tools," Streaming Media.com; www.streamingmedia.com/ article.ap?id=5768, Jun. 30, 2000.
"Not Your Average Jukebox", www.alwayson-network.com/comments.php?id=P12663 0 37 0 C, Web Page, Not Your Average Jukebox, On Hollywood 1000 contender Ecast uses broadbank to being the digital media experience to your watering hole. Posted Nov. 4, 2005.
www.ecastinc.com/music_licensing.html, Web Page, Ecast Network, interactive entertainment network, Music/Licensing.
www.roweinternational.com/jukeboxes_dia.html, Web Page, Digital Internet Access Jukeboxes, Rowe International.
www.akoo.com/Akoo/, Web Page, Akoo, Pick the Music, Waiting in the line at the Theme Park, Introducing the m-Venue™ platform.
www.touchtunes.com, Web Page, Touchtunes, Turn your ROWE 100A's and 100B's into touch tunes Digital Jukeboxes—BOSE.
"RFID Brings Messages to Seattle Sidewalks", www.rfidjournal.comfarticle/articleview/1619/1/1, Web Page, RFID brings messages to Seattle sidewalks on RFID system being deployed next week will send marketing and assistive information to users carrying active RFID tags. RFID Journal (pp. 1-4), May 26, 2004.

\* cited by examiner

Synthesizing user tastes from playcounts and playlists.

Getting individual recommended mediasets.

Aggregating individual recommended mediasets into a recommended mediaset suitable for the whole group of users.

Update Session Members Flow Diagram

Service Proxy Requests Flow Diagram

FIG. 27A

MEDIASET GENERATION SYSTEM

RELATED APPLICATIONS

This application is a divisional[1] of application Ser. No. 11/513,495 filed Aug. 31, 2006 now abandoned, which is a continuation-in-part of application Ser. No. 11/346,818 filed Feb. 3, 2006 now U.S. Pat. No. 7,734,569 and titled "Recommender System for Identifying a New Set of Media Items Responsive to an Input Set of Media Items and Knowledge Base Metrics." This application claims the benefit under 35 U.S.C. §119(e) of U.S. Provisional Patent Application No. 60/772,502 filed Feb. 10, 2006, and titled "System and Method for Building and Sharing a Composite Playlist from Collective Group Tastes on Multiple Media Playback Devices." This application also claims the benefit under 35 U.S.C. §119(e) of U.S. Provisional Patent Application No. 60/774,072 filed Feb. 15, 2006, and titled "Mediaset Recommendations for a Group of Users." This application also claims the benefit under 35 U.S.C. §119(e) of U.S. Provisional Patent Application No. 60/796,724 filed May 1, 2006, and titled "Dynamically Building Composite Playlist for Merging Collective User Tastes." Each of the foregoing applications is incorporated herein by specific reference.

[1]This divisional application is based on original claims 26-33 in the parent application.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which:

FIG. 27A is a representation in matrix form of a metric describing the similarity values between collections of media items.

Figure 1:
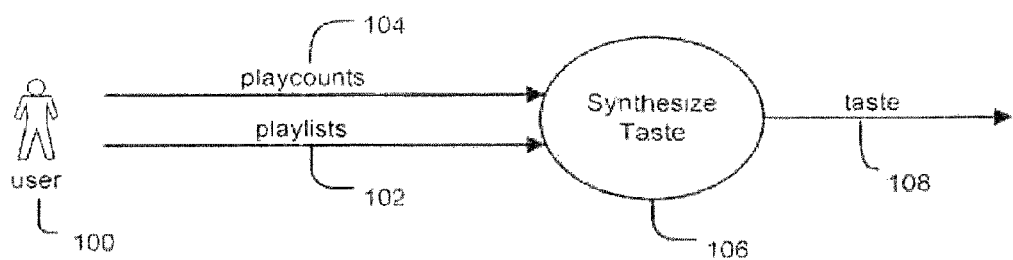
FIG. 1 is a diagram of one embodiment of a system for synthesizing a user's taste by analyzing the user's playlist(s) and playcounts.

In general, our invention is applicable to any kind of media item that can be grouped by users to define mediasets. For example, in the music domain, these mediasets are called playlists. Users put songs together in playlists to overcome the problem of being overwhelmed when choosing a song from a large collection, or just to enjoy a set of songs in particular situations. For example, one might be interested in having a playlist for running, another for cooking, etc.

Different approaches can be adopted to help users choose the right options with personalized recommendations. One kind of approach is about using human expertise to classify the media items and then use these classifications to infer recommendations to users based on an input mediaset. For instance, if in the input mediaset the item x appears and x belongs to the same classification as y, then a system could recommend item y based on the fact that both items are classified in a similar cluster. However, this approach requires an incredibly huge amount of human work and expertise. Another approach is to analyze the data of the items (audio signal for songs, video signal for video, etc) and then try to match users preferences with the extracted analysis. This class of approaches is yet to be shown effective from a technical point of view.

BRIEF SUMMARY OF PRESENTLY PREFERRED EMBODIMENTS

This invention addresses the problem of assisting users in building their mediasets by recommending media items that go well together with an initial (or input) mediaset. The recommendation is computed using metrics among the media items of a knowledge base of the system. This knowledge base comprises collections of mediasets from a community of users. (As explained below, a mediaset is not a collection of media items or content. Rather, it is a list of such items, and may include various metadata.) Preferably, the methods of the present invention are implemented in computer software.

The invention in one aspect embodies a system for identifying a set of media items in response to an input set of media items. The system requires a knowledge base consisting of a collection of mediasets. Mediasets are sets of media items, which are naturally grouped by users. They reflect the users subjective judgments and preferences. The mediasets of the knowledge base define metrics among items. Such metrics indicate the extent of correlation among media items in the mediasets of the knowledge base.

Various different metrics between and among media items can be generated from the knowledge base of mediasets. Such metrics can include but are not limited to the follow examples:
  a) Pre-concurrency (for ordered mediasets) between two items is computed as the number of times a given item precedes the other item in the mediasets of the knowledge base.
  b) Post-concurrency (for ordered mediasets) between two items is computed as the number of times an item follows another item in the mediasets of the knowledge base.
  c) Co-concurrency between two items is computed as the number of times the items appear together in a mediaset.
  d) Metadata similarities may be computed as well by considering keywords associated with the media items such as artist, actor, date, etc.
  e) Combinations of the previous metrics can be useful.
  f) Combinations of the previous metrics applying transitivity.

Such metrics can be represented in an explicit form that directly associates media items with other media items. For each media item of the input set, the system retrieves n media items with highest metrics. These media items are called candidates. Then, the recommended set of media items is a subset of the candidates that maximize an optimization criterion. Such criterion can be simply defined using the metrics of the knowledge base of the system. Furthermore, such criterion can also include filters including but not limited to:
  a) Filters that the user expresses to focus the recommendation only on a determined type of items.
  b) Filters that the user expresses to focus the recommendations on items that meet certain keyword-based criteria, such as a specific artist/s, year/s, genre/s, etc.
  c) Filters that personalize the recommendations to the user. This kind of filtering includes recommending only items that the user knows about, or only items that the user does not know about, etc.

Additional aspects and advantages will be apparent from the following detailed description of preferred embodiments, which proceeds with reference to the accompanying drawings.

DETAILED DESCRIPTION OF PREFERRED EMBODIMENTS

Reference is now made to the figures in which like reference numerals refer to like elements. For clarity, the first digit of a reference numeral indicates the figure number in which the corresponding element is first used.

In the following description, certain specific details of programming, software modules, user selections, network transactions, database queries, database structures, etc. are omitted to avoid obscuring the invention. Those of ordinary skill in computer sciences will comprehend many ways to implement the invention in various embodiments, the details of which can be determined using known technologies.

The system preferably comprises or has access to a knowledge base which is a collection of mediasets. A mediaset is a list of media items that a user has grouped together. A media item can be almost any kind of content; audio, video, multimedia, etc., for example a song, a book, a newspaper or magazine article, a movie, a piece of a radio program, etc. Media items might also be artists or albums. If a mediaset is composed of a single type of media items it is called a homogeneous mediaset, otherwise it is called a heterogeneous mediaset. A mediaset can be ordered or unordered. An ordered mediaset implies a certain order with respect to the sequence in which the items are used[2] by the user. Note again that a mediaset, in a preferred embodiment, is a list of media items, i.e. meta data, rather than the actual content of the media items. In other embodiments, the content itself may be included. Preferably, a knowledge base is stored in a machine-readable digital storage system. It can employ well-known database technologies for establishing, maintaining and querying the database.

[2] Depending on the nature of the item, it will be played, viewed, read, etc.

In general, mediasets are based on the assumption that users group media items together following some logic or reasoning, which may be purely subjective, or not. For example, in the music domain, a user may be selecting a set of songs for driving, hence that is a homogeneous mediaset of songs. In this invention, we also consider other kinds of media items such as books, movies, newspapers, and so on. For example, if we consider books, a user may have a list of books for the summer, a list of books for bus riding, and another list of books for the weekends. A user may be interested in expressing a heterogeneous mediaset with a mix of books and music, expressing (impliedly) that the listed music goes well with certain books.

A set of media items is not considered the same as a mediaset. The difference is mainly about the intention of the user in grouping the items together. In the case of a mediaset the user is expressing that the items in the mediaset go together well, in some sense, according to her personal preferences. A common example of a music mediaset is a playlist. On the other hand, a set of media items does not express necessarily the preferences of a user. We use the term set of media items to refer to the input of the system of the invention as well as to the output of the system.

A metric M between a pair of media items i and j for a given knowledge base k expresses some degree of relation between i and j with respect to k. A metric may be expressed as a "distance," where smaller distance values (proximity) represent stronger association values, or as a similarity, where larger similarity values represent stronger association values. These are functionally equivalent, but the mathematics are complementary. The most immediate metric is the co-concurrency (i, j, k) that indicates how many times item i and item j appear together in any of the mediasets of k. The metric pre-concurrency (i, j, k) indicates how many times item i and item j appear together but i before j in any of the mediasets of k. The metric post-concurrency (i, j, k) indicates how many times item i and item j appear together but only i after j in any of the mediasets of k. The previous defined metrics can also be applied to considering the immediate sequence of i and j. So, the system might be considering co/pre/post-concurrencies metrics but only if items i and j are consecutive in the mediasets (i.e., the mediasets are ordered). Other metrics can be considered and also new ones can be defined by combining the previous ones.

A metric may be computed based on any of the above metrics and applying transitivity. For instance, consider co-concurrency between item i and j, $co(i,j)$, and between j and k, $co(j,k)$, and consider that $co(i,k)=0$. We could create another metric to include transitivity, for example $d(i,k)=1/co(i,j)+1/co(j,k)$. These type of transitivity metrics may be efficiently computed using standard branch and bound search algorithms. This metric reveals an association between items i and k notwithstanding that i and k do not appear within any one mediaset in K.

A matrix representation of metric M, for a given knowledge base K can be defined as a bidimensional matrix where the element $M(i,j)$ is the value of the metric between the media item i and media item j.

A graph representation for a given knowledge base k, is a graph where nodes represent media items, and edges are between pairs of media items. Pairs of media items i, j are linked by labeled directed edges, where the label indicates the value of the similarity or distance metric $M(i,j)$ for the edge with head media item i and tail media item j.

DETAILED DESCRIPTION OF PREFERRED EMBODIMENTS

In the following description, certain specific details of programming, software modules, user selections, network transactions, database queries, database structures, etc., are provided for a thorough understanding of the specific preferred embodiments of the invention. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. In some embodiments, the methodologies and systems described herein may be carried out using one or more digital processors, such as the types of microprocessors that are commonly found in PC's, laptops, PDA's and all manner of other desktop or portable electronic appliances.

Disclosed are embodiments of systems, methods, and apparatus for generating mediasets comprising a plurality of media data items. As used herein, the term "media data item" is intended to encompass any media item or representation of a media item. A "media item" is intended to encompass any type of media file which can be represented in a digital media format, such as a song, movie, picture, e-book, game, etc. Thus, it is intended that the term "media data item" encompass, for example, playable media item files (e.g., an MP3 file), as well as metadata that identifies a playable media file (e.g., metadata that identifies an MP3 file). It should therefore be apparent that in any embodiment providing a process, step, or system using "media items," that process, step, or system may instead use a representation of a media item (such as metadata), and vice versa.

In one embodiment, a system to provide recommendations of mediasets for a given group of users is provided. Embodiments of such a system may comprise a mechanism to store playlists and/or playcounts of each member in a community of users. Playlists and playcounts may be used to define the taste of each user and may therefore be used in performing taste analyses for each of the respective users.

In accordance with the general principles set forth above, embodiments of the invention may be used to address the problem of recommending a mediaset or group playlist to a group of users in a community or network. In some embodiments, a mediaset recommender may be provided where the input is a set of media items, and the output is a mediaset of weighted media items. Two illustrative methods for providing group recommendations of mediasets include: 1) building a common profile that expresses the taste of the group of users as a whole and applying that profile to the recommender; and 2) considering individual recommendations of each member taste, and aggregating the results.

Media players are typically capable of reproducing all types of media items and collecting playcounts and playlists. Playcounts are the number of times a media item has been played in the media player. Playlists are groupings of media items that users create to organize their libraries of media items. A system (e.g., a server) may be used to collect playcounts and playlists of media items of a community of users.

Playcounts and playlists of a user may be used to synthesize her or his taste or perform a taste analysis. In that sense, user's taste may be considered a collection of the most relevant taste data considering that user's playcounts and playlists.

The task of certain embodiments of this system is to recommend a mediaset for a group of users. A mediaset recommendation for a group of users may be the result of an aggregation process of the different mediasets that are recommended to each user of the group. Thus, some embodiments of this system may include a component that recommends a mediaset from another mediaset (by performing an analysis of the taste of each user, for example). The aggregation process may apply, for example, a voting schema and/or an optimization schema.

Mediaset recommendations for a group of users may be useful in a variety of scenarios. An example is a party where a group of people want to enjoy music together. Instead of playing the music that may be recommended to a particular individual in the group, it may be desirable to play the music that would be recommended to the group as a whole.

As such, in certain embodiments, the system's task is to find a mediaset or playlist to be recommended to a group of users. In embodiments wherein the system is collecting playcounts and/or playlists from the users, such a recommender system may be composed of three main steps:

1) Synthesizing user tastes;
2) Producing recommended mediasets for each user taste; and 3) Aggregating the set of recommended mediasets into a single mediaset to be recommended to the whole group of users.

It should be understood that numerous variations on the content, scope, and order of these steps are contemplated. For example, the step of producing recommended mediasets for each user taste may be optional.

FIG. 1 depicts how the taste 108 of a user 100 may be built from the playcounts 104 and playlists 102 of that user 100 through a process 106 called Synthesize Taste. It should be understood that process 106 is one example of a taste analysis. Process 106 produces a taste 108, which may be encoded as a mediaset. As part of process 106, media items with higher playcounts and/or those that appear more in playlists may be selected. The selected media items may include those that are played more often by the user and/or those that are used in more different contexts and situations (because they appear in many different playlists). In some embodiments, playcounts may also be associated with play dates. In such cases, the process may weigh the playcounts with the play dates and therefore give more relevance to recent playcounts than to older playcounts.

Process 106 may comprise a ranking process of the media items of a user where items with higher playcounts, more recent plays, and/or more playlist appearances get a higher ranking. The process may select the top m ranked media items as the encoding of the user's taste 108. Note that this process may produce different results over time for the same user. This may be a desirable feature in embodiments in which the goal is to encode the taste of a user as it evolves over time.

Figure 2:
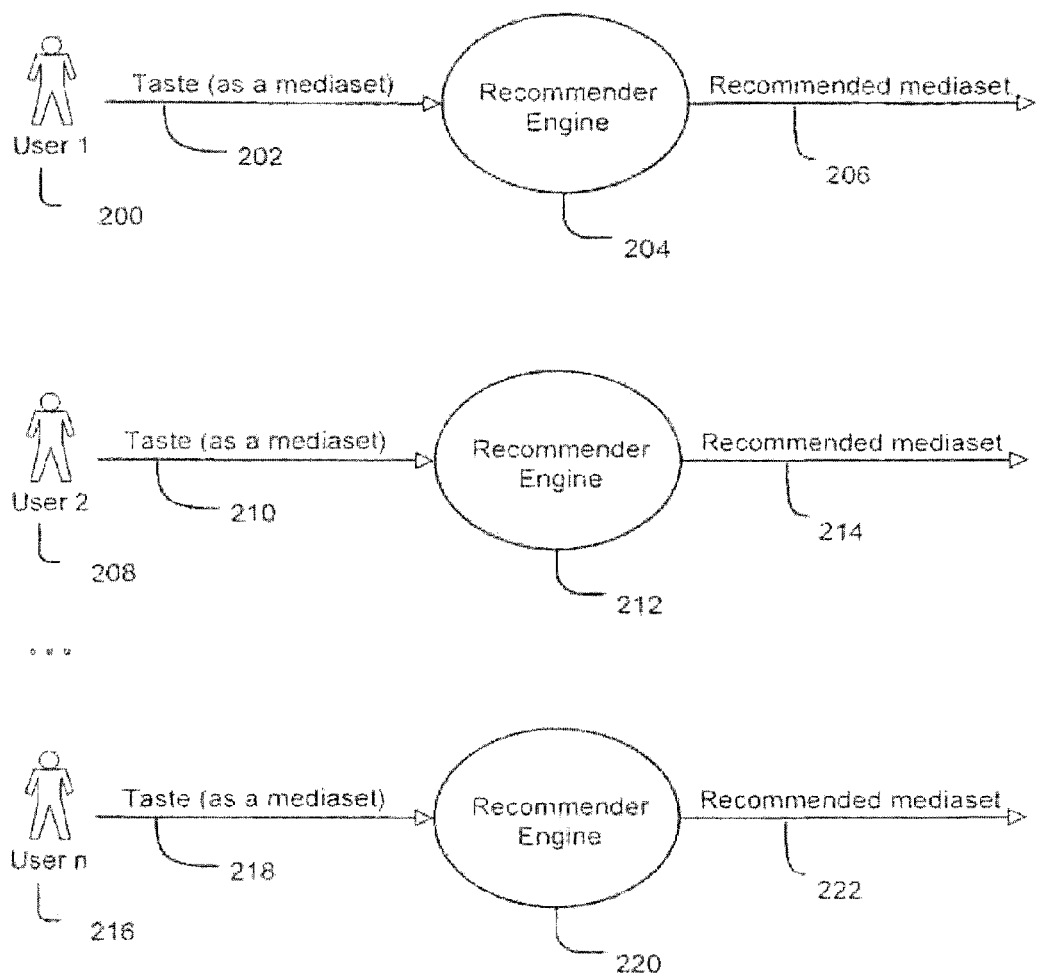
FIG. 2 is a diagram of one embodiment of a system for using taste analyses from a plurality of users to generate a plurality of recommended mediasets.

In some embodiments, the system may provide individual mediaset recommendations. For example, with reference to FIG. 2, given a group of n users 200, 208, and 216, the system may compute the individual taste (202, 210, and 218, respectively) for each user with, for example, the process described above. The system may provide a recommended mediaset for each user using a recommender engine (204, 212, and 220, respectively) that processes user tastes (mediasets 202, 210, and 218) to produce recommended mediasets 206, 214, and 222. It should be understood that a separate recommended engine may be used for each user (recommender engines 204, 212, and 220), as shown in FIG. 2 or, alternatively, a single recommender engine may be used for the entire group. Thus, in total the depicted system may compute n mediasets of m media items.

Figure 3:
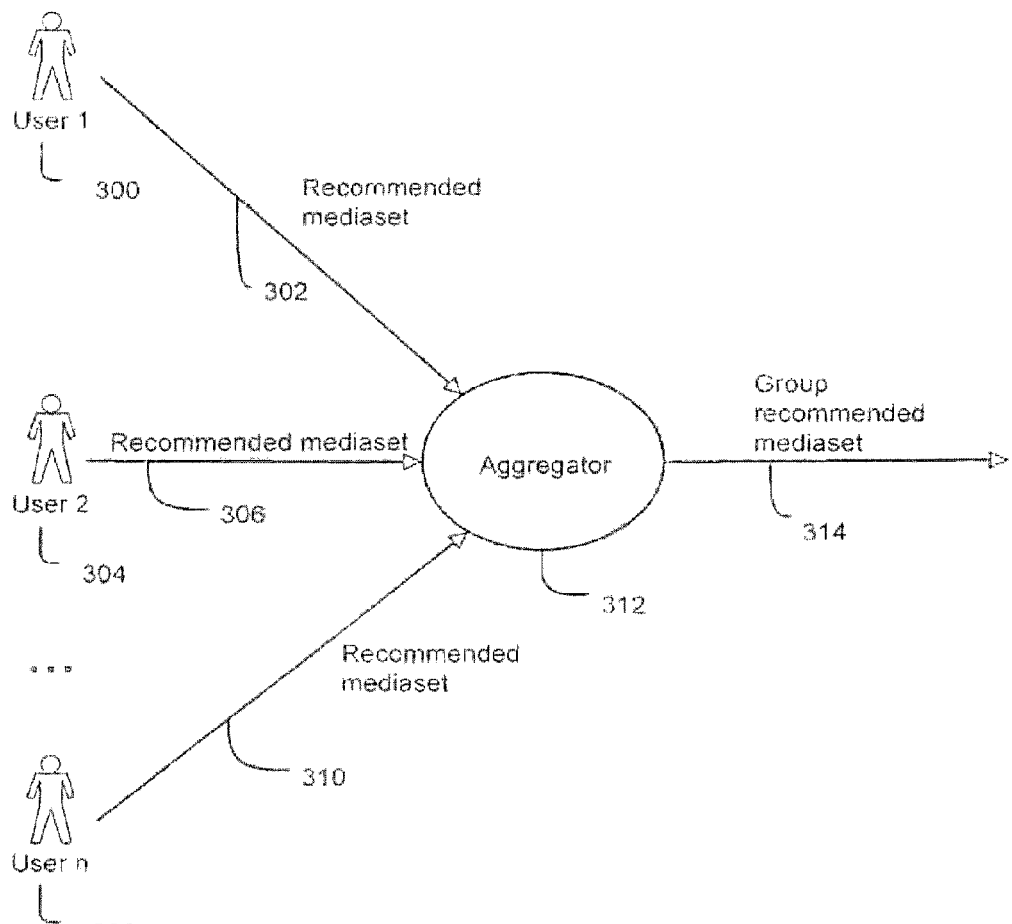
FIG. 3 is a diagram of one embodiment of a system for using recommended mediasets from a plurality of users to generate a recommended mediaset for a group of users.

In some embodiments, the system may also provide for aggregating individual recommended media sets into a group recommended mediaset or group playlist. For example, with reference to FIG. 3, once the system has computed the n mediasets of m media items (one for each user 300, 304, 308 of the group), an aggregation step may be used to produce the final mediaset of p (p≤n*m) media items 314 to be recommended to the group of users. As shown in FIG. 3, the system may provide an aggregator 312, which takes as input a recommended mediaset (302, 306, and 310, respectively) from each of the users in the group and provides therefrom a group recommended mediaset 314.

The aggregation step may be performed, for example, by following different approaches that serve different goals. As previously mentioned, in two preferred embodiments, the system may follow a) a voting schema; or b) an optimization schema. A voting schema may serve the goal of finding a mediaset that the majority of users would be happy with, without considering the degree of dislike by the rest of the members of the group. On the other hand, an optimization schema may produce a mediaset that minimizes the dislike (or maximizes the like) of all the members of the group. In order to apply an optimization schema, the media items in the n recommended mediasets 302, 306, 310 may each be linked with an associated weight. The weight of a media item in a mediaset for a user may be used to indicate the relevance of that media item for the user.

With a voting schema, the aggregation process may take the p media items that appear the most in the n mediasets. If there are items that appear the same number of times in the n mediasets (tie-break), then those items may be picked randomly.

Some recommender engines may produce mediasets having weighted media items. In such embodiments, when a tie-break situation happens, instead of picking the items randomly, the process may pick the media items with highest weights. For example, considering the following mediasets:

ms1={s3, s7, s8, s10}
ms2={s2, s3, s4, s10}
ms3={s3, s4, s7} then, following the voting schema described above, the media items (s#) in the mediasets (ms#) would be ranked as follows:

s1=0, s2=1, s3=3, s4=2, s5=0, s6=0, s7=2, s8=1, s9=0, s10=2

Thus, the media items for the recommended group mediaset would be selected in the following order: s3, s4, s7, s10, s2, s8. Media items s7 and s10 are in a tie-break situation, so they could be ordered in accordance with their respective weights within their mediasets, if any. If the media items do not have associated weights, then the order of s7 and s10 may be randomized. The same would apply for items s2 and s8.

With an aggregation schema, the aggregation process may take the p media items that optimize some utility function considering all the users of the group, that is, considering all n mediasets 302, 306, 310. In order to apply the optimization schema, the media items in the n mediasets 302, 306, 310 may have an associated weight, for example, in the range from 0 to 1, where 0 means that the item is not relevant at all and 1 means that the item is the most relevant. For a given mediaset j, a media item i may therefore have a weight $w(j,i)$. If a media item i is not in a mediaset j, then it may be considered to have a weight 0. The following example illustrates the weights associated with media items for a collection of mediasets:

ms1={s3, s7, s8, s10}
ms2={s2, s3, s4, s7, s10}
ms3={s3, s4, s7}
w(1)=[0, 0, 0.1, 0, 0, 0, 0.3, 0.2, 0, 0.9]
w(2)=[0, 0.2, 0.5, 0.4, 0, 0, 0.3, 0, 0, 0.9]
w(3)=[0, 0, 0.1, 0.8, 0, 0, 0.3, 0, 0, 0.5]

A number of different utility functions may be chosen in order to aggregate the media items. For example, a utility function may be selected to maximize the sum for all p selected items of the highest weight in any of the n mediasets. If it is desired to select p=3 items in accordance with this utility function, s10, s4, and s3 would be selected. The sum of the highest weights for these items is 0.9+0.8+0.5=2.2, which is the maximum we can get with the above example.

Alternatively, a utility function may be selected to maximize the sum for all p selected items of the lowest weight in any of the n mediasets. If it is desired to select p=3 items in accordance with this utility function, s10, s7, and s3 would be selected. The sum of the lowest weights for these items is 0.5+0.3+0.1=0.9, which is the maximum we can get with the above example.

As still another alternative, a utility function may be selected to maximize the sum for all p selected items of the mean weight of all of the n mediasets. If it is desired to select p=3 items in accordance with this utility function, s10, s4, and s7 would be selected. The sum of the average of weights for these items is 2.3/3+1.2/3+0.9/3=1.16, which is the maximum we can get with the above example. Of course, other utility functions may be employed, as will be apparent to one having ordinary skill in the art.

A recommender engine may be provided in some embodiments. In embodiments that do not include a recommender engine, the mediasets that encode the user tastes may be directly aggregated to form the mediaset that would be recommended to the whole group of users.

A system using the recommender engine may propose mediasets to discover new music, whereas a system that does not provide a recommender engine may propose mediasets with media items already known by at least one of the users in the group.

As should be apparent, the aforementioned systems and methods may produce mediaset recommendations for a group of n users so as to enable proposing a mediaset that can be enjoyed simultaneously by a group of users. The system may analyze user tastes from playlists and/or playcounts, so as to allow the user tastes to be represented as mediasets. These n user tastes can be then the input of a recommender engine that may suggest another n mediasets. An aggregation process that takes these mediasets and produces a single group mediaset may also be provided. Such a process can be done using, for example, a voting schema or an optimization schema. Similar systems may operate without a recommender engine. In such embodiments, the aggregation process may operate with the mediasets that represent the tastes of the n users, and the result may comprise a mediaset that can be recommended to the whole group of users.

Additional embodiments are disclosed and described with reference to FIGS. 4-14. In some of these embodiments, composite playlists may be built of media items in individual libraries on multiple media devices in a common location and/or through a communication network. The media devices in the group may include portable and/or non-portable devices. A means for playing the composite playlist may step through the playlist in sequence and cause the media player with the indicated media item to stream it to one or more of the other players where possible. Such embodiments may operate under, for example, a client-server architecture or a P2P distributed architecture. These embodiments may therefore be used to coordinate a set of media players to transmit media items on the specified group playlist in streaming fashion to each of the individual media players, or to a specified subset of the media players, in the sequential order they are listed on the group playlist. This may be accomplished without transferring standalone copies of the media items between the various media players.

Those skilled in the art will recognize that systems incorporating the features of one or more of the above-described embodiments may be realized as a collection of media devices whose design embodies the disclosed functional behavior, as a collection of layered protocols in the 7-level ISO Open Systems Interconnection Reference Model, or as an application task in media devices communicating using standard networking protocols.

Some preferred implementations will consist of three major components. The first component is a plurality of Session Managers which collectively coordinate the information needed to designate and manage the status of each media player with regard to a plurality of other media player devices engaged in a period of collaborative activity referred to as a "session". In a preferred implementation, one Session Manager may be associated with each media player device, although this need not be the case in all implementations. The Session Managers may include means for verifying the eligibility of each device to join the session. This may be accomplished by virtue of the eligible users being subscribed to a service, which may provide legal access to the media items to be collectively enjoyed.

The second component of the aforementioned implementation is a Playlist Builder, which may reside, for example, on one of the media players, on a server, on a network access controller included in the system, or on a third-party server accessible to the media player devices through a communication network. The Playlist Builder may use information, such as taste data, available about the users in the group, and the collective set of media items available to the media players, to build a group playlist compatible with the collective tastes of the group.

The third component of the aforementioned implementation is a plurality of Playlist Managers, one associated with each media player device, which collectively communicate with the Playlist Builder to provide the information needed to build the group playlist and to play the media items on the group playlist. The Playlist Manager associated with each media player device may include functionality for communicating the availability of media items on the media player device, either in a local library or from a media streaming service accessible by a media player, for example. The Playlist Manager may also include a Playlist Play subcomponent, which may work in coordination with the counterpart subcomponents on the other media players in the session to step through each item on the group playlist, and may be configured to cause the media player associated with a media item to stream it to one or more of the other players as each media item is encountered.

Figure 4:
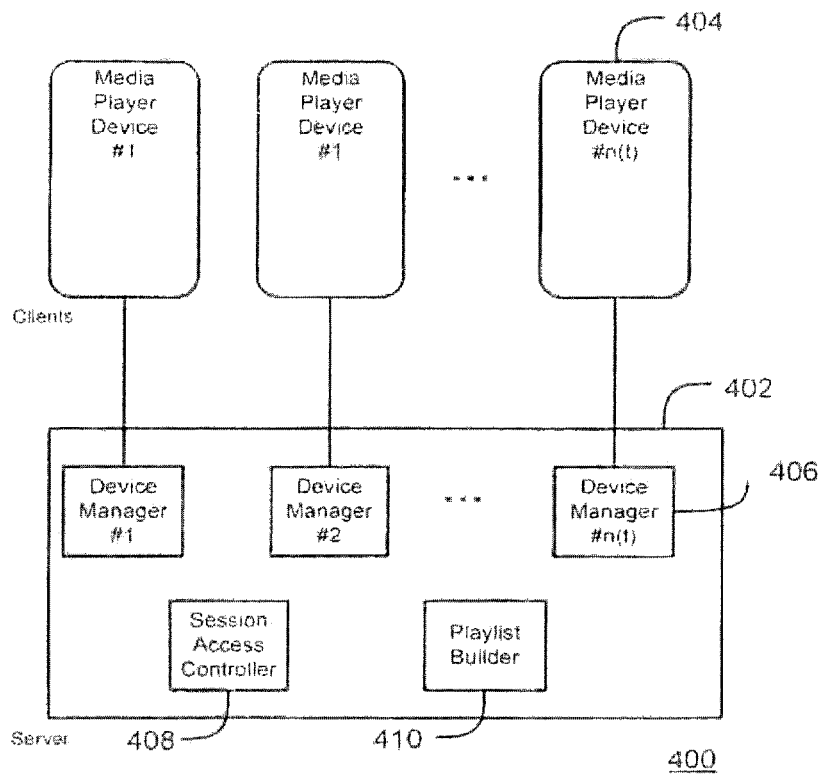
FIG. 4 is a system diagram of a client-server embodiment of the invention.
Figure 5:
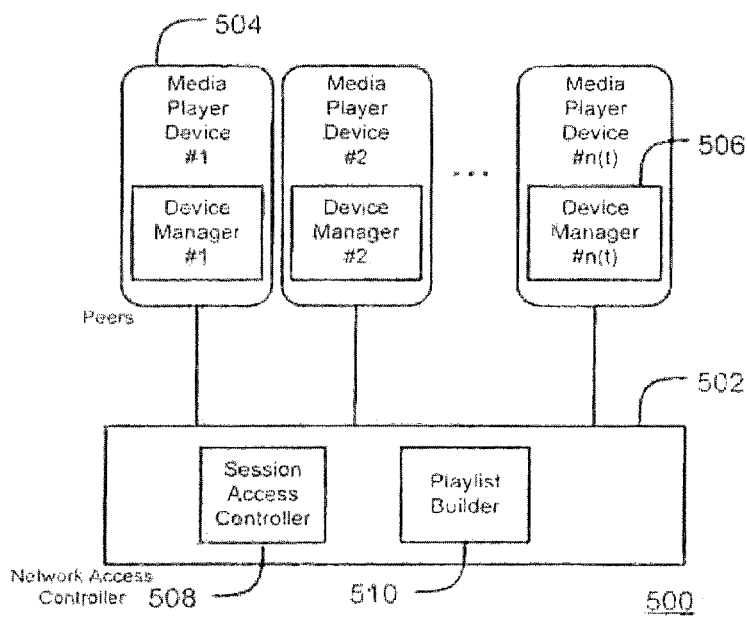
FIG. 5 is a system diagram of a peer-to-peer embodiment of the invention.

With reference again to the drawings, further aspects of certain embodiments will now be described in greater detail. Two such alternative embodiments are shown in FIGS. 4 and 5. FIG. 4 is a system diagram of a client-server embodiment 400 and FIG. 5 is a system diagram of a peer-to-peer embodiment 500. Both embodiments of the invention may have the same essential components. However, the client-server embodiment 400 of FIG. 4 will be described in greater detail herein than the peer-to-peer embodiment. Nevertheless, It should be understood that the disclosure provided herein may apply equally to the peer-to-peer system with the appropriate system organizational differences, as depicted in the figures.

The key components of a client-server embodiment 400 are the server functional unit 402 and one or more Media Player Device clients 404. The server 402 may include three basic functional components: 1) A Session Access Controller 408, which may be used to grant permission for an individual media player to join the collaborative interaction between devices; 2) A Playlist Builder 410, may be used to construct the list and sequence of media items to be played in the group playlist during the session; and 3) A Device Manager 406 for each Media Player Device 404 in the session, which may be used to control the session-related functions of the device.

The peer-to-peer embodiment 500, as shown in FIG. 5, also includes a plurality of media player devices 504. Each of the media player devices 504 may include a device manager 506. A network access controller 502 may also be provided, which includes a session access controller 508 and a playlist builder 510 for receiving media item data from the plurality of media devices and for building a composite playlist of media data items from the media item data.

Figure 6:
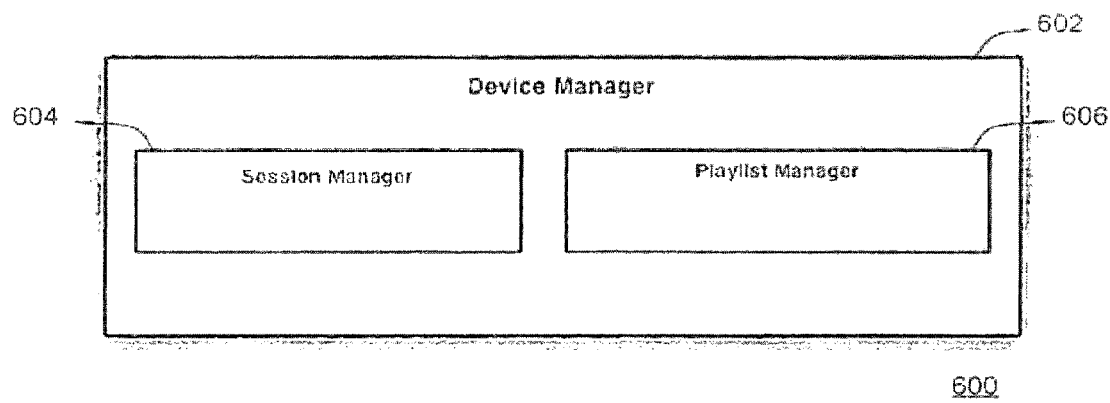
FIG. 6 depicts the main functional components of a Device Manager according to one embodiment.

The device manager for each media player device may include a session manager and a playlist manager. For example, FIG. 6 depicts a device manager 602 having a session manager 604 and a playlist manager 606. Session manager 602 may be configured to manage the status of the media device with which it is associated.

Figure 7:
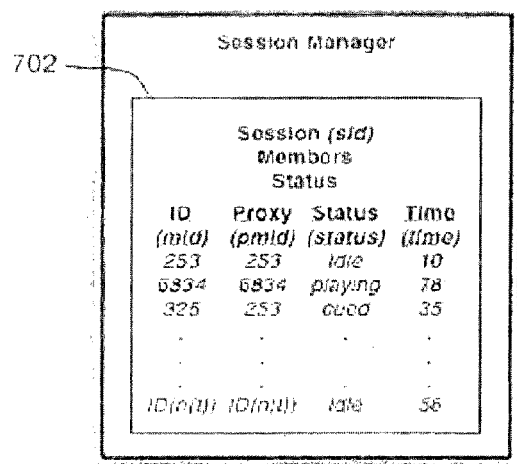
FIG. 7 depicts a Member Status screen of a Session Manager, which presents the relevant details of the data structures in the Session Manager subcomponent of the Device Manager of one embodiment.

FIG. 7 depicts a Member Status screen 702 that is associated with one embodiment of a session manager. As shown in FIG. 7, the session manager may track a series of categories of information for each of the media players in the session, such as ID, proxy, status, and time period information.

Playlist manager 606 may be configured to communicate with a playlist builder to send the media item data of the media device with which it is associated to the playlist builder and to play the media data items on the composite playlist on the media device with which it is associated.

As shown in FIG. 4 for the server-client configuration, and FIG. 5 for the peer-to-peer configuration, each media player device 404 may have an associated instance of the device manager 602 of FIG. 6. In addition, the server 402 and network access controller 502 may include a single instance of the session access controller 408, 508 and the playlist builder 410, 510.

The session access controller 408, 508 may interact, as described in greater detail later, with the session manager 604 in the device manager 602 of each media device 404 in a system to define the set of media devices comprising a session, and to enable communications between them. Similarly, the playlist builder 410, 510 may operate with the playlist manager 606 in the device manager 602 to define and perform a sequence of media items in a session.

Figure 8:
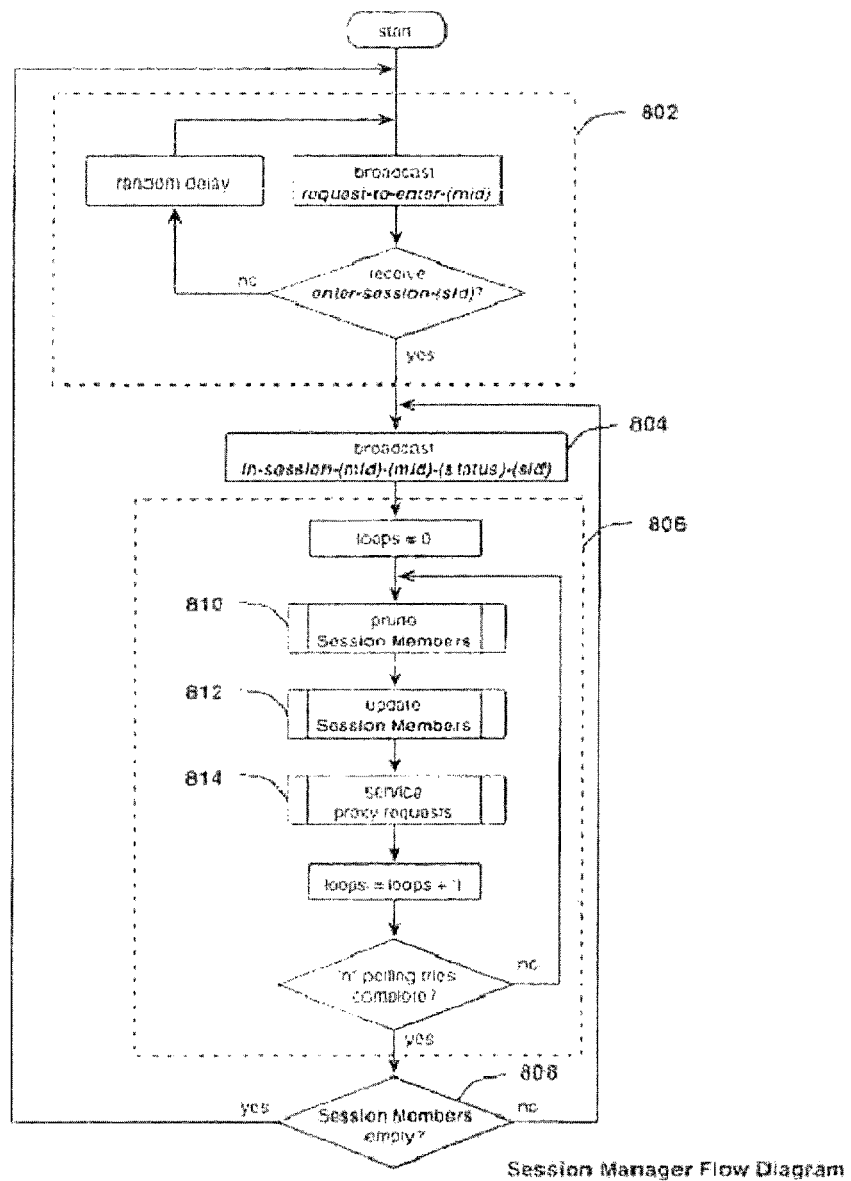
FIG. 8 is a top-level flow diagram of the operation of the Session Manager subcomponent of the Device Manager of one embodiment.

FIG. 8 presents a top-level flow diagram of one embodiment of a session manager 604 in a device manager 602. The session manager of an individual media player device may be used to negotiate the introduction, operation, and departure of the device in a media playing session (henceforth "session"). This may include maintaining knowledge of all other media players devices in the session.

The session manager 604 may assume the presence of a single session access controller 408 on a server system 402 in the client-server configuration, or on a privileged peer-to-peer network access system 502 in the peer-to-peer configuration. In peer-to-peer embodiments, the network access system could be implemented on the system found in some peer-to-peer networks, which hosts network-level functions, while in other embodiments it could be implemented on one peer system in the network.

The session access controller's primary function in some embodiments is to serve a session sID code in response to a "request-to-enter" session message from devices seeking admission into a session as an indication permission has been granted to the device. In some embodiments, that permission may be granted if the media player mID code from the device supplied with the "request-to-enter" message is recognized as an mID eligible for admission to a session. In other embodiments, the session access controller may instead supply a dynamic mID back to the requesting media player device to serve as a unique identifier for the device in the context of the session along with the returned session sID code. In some embodiments, the session access controller may largely be functional in the networking protocol for the underlying communications network linking the media player devices, and the mID and sID may be codes derived from parameters in the network protocol that identify devices and communication sessions or transactions.

The session manager may include two major subfunctions 802 and 806, as shown in FIG. 8. Subfunction 802 mediates the admission of the media player into a session while subfunction 806 implements the process by which the media player maintains cognizance of the other media players in the session via the communication network linking.

The starting step for the session manager flow diagram of FIG. 8 assumes the media player is not participating in a session. As shown in the subfunction of 802, the session manager broadcasts a "request-to-enter" message with an optional "mID" code. If the media device successfully communicates with a session access controller that grants the media player access to a session, the media player will receive an "enter-session-sID" message indicating that the media player has been granted permission to enter the session identified by the sID code. In embodiments having only one session, the sID code would be superfluous and may be omitted or a default value returned.

If an "enter-session-sID" response message is not received, the session manager waits a random amount of time before transmitting another "request-to-enter" message. In some embodiments, the session manager may just wait a random amount of time after transmitting a "request-to-enter" message before transmitting another "request-to-enter" message if an "enter-session-sID" response is not received. In other embodiments, the session manager may wait a fixed amount of time after sending the "request-to-enter" message and then, if no "enter-session-sID" response is received, wait a random amount of time before transmitting the next "request-to-enter" message. In yet other embodiments, the session manager may wait until some external event occurs after sending the "request-to-enter" message, rather than receiving an "enter-session-sID", and then wait a random amount of time before transmitting the next "request-to-enter" message.

Upon receipt of an "enter-session-sID" response from the session access controller, the session manager broadcasts the "in-session-mId-mId-status-sID" message, as indicated at 804. By broadcasting this message, the session manager indicates its presence in the session to the session managers in all of the other devices in the session. The parameters of this message (mID, mID, status, sID), are the mID of this media player device, the mID of another media player device in the session that knows about this device by proxy (set here to the mID of this media player device because no proxy is involved), the status of the playlist manager component 606 of the device manager 602, and the session sID.

After broadcasting the "in-session-mId-mId-status-sID" message, the session manager initiates the subfunction 806, which maintains knowledge of the other media players in the session identified by a particular sID. Subfunction 806 is a polling loop that maintains the information in a session manager state data structure, such as that shown in FIG. 7. The Device Manager 602 in each media player maintains a copy of the session manager state autonomously for each session, as identified by a unique sID, in which the media player is a participant. This state information may include several elements for each of the other media players in the session known to the subject media player: One such element is the mID of the media player. Another is the mID (referred to as the pmID) of the proxy media player in the session known to the subject media player, which knows the media player identified by mID is in the session, even if that media player is not known directly to the subject media player. A third example is the status of the media player. Still another example is the amount of time since this media player was last affirmatively known to be in the current session by the subject media player.

The polling loop in Subfunction 806 may be executed a number of times "n" as determined by the implementation. This number is relatively arbitrary, and typically is selected to achieve a desired "liveliness" criteria for the session manager and the session maintenance protocol. "Liveliness" here refers to how often the subject media player indicates its presence in the session to the other media players in the session. As the flow diagram indicates at 804, the session manager may broadcast an "in-session-mid-mid-status-sid" message to the other media players to indicate the subject media player is still active in the session and make its status known to those media players if the session manager state data table 702 includes entries for other media players. If the session manager state data table 702 is empty, the session manager may instead revert to searching for a session to join by initiating the session join subfunction 802.

Figure 9:
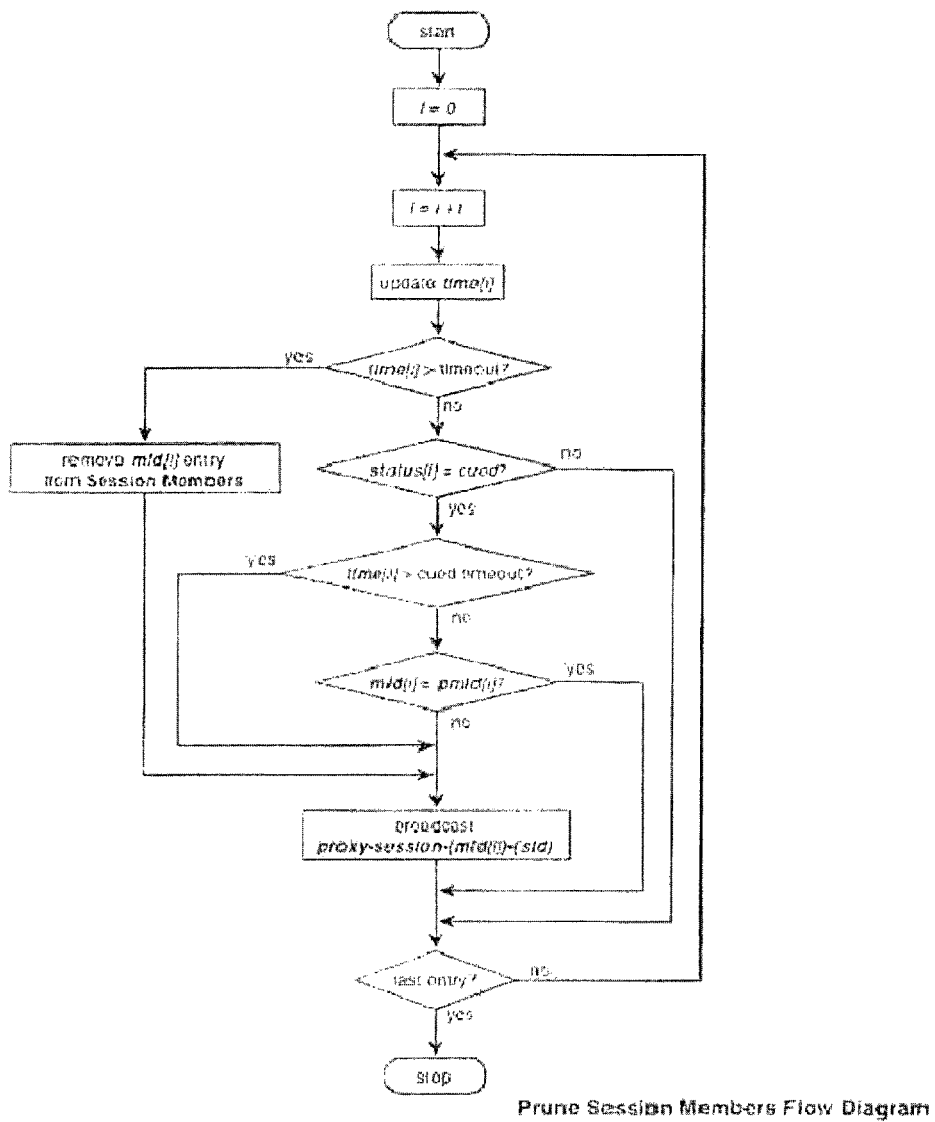
FIG. 9 is a more detailed flow diagram of the "Prune Session Members" step in the Session Manager flow diagram of FIG. 8.
Figure 10:
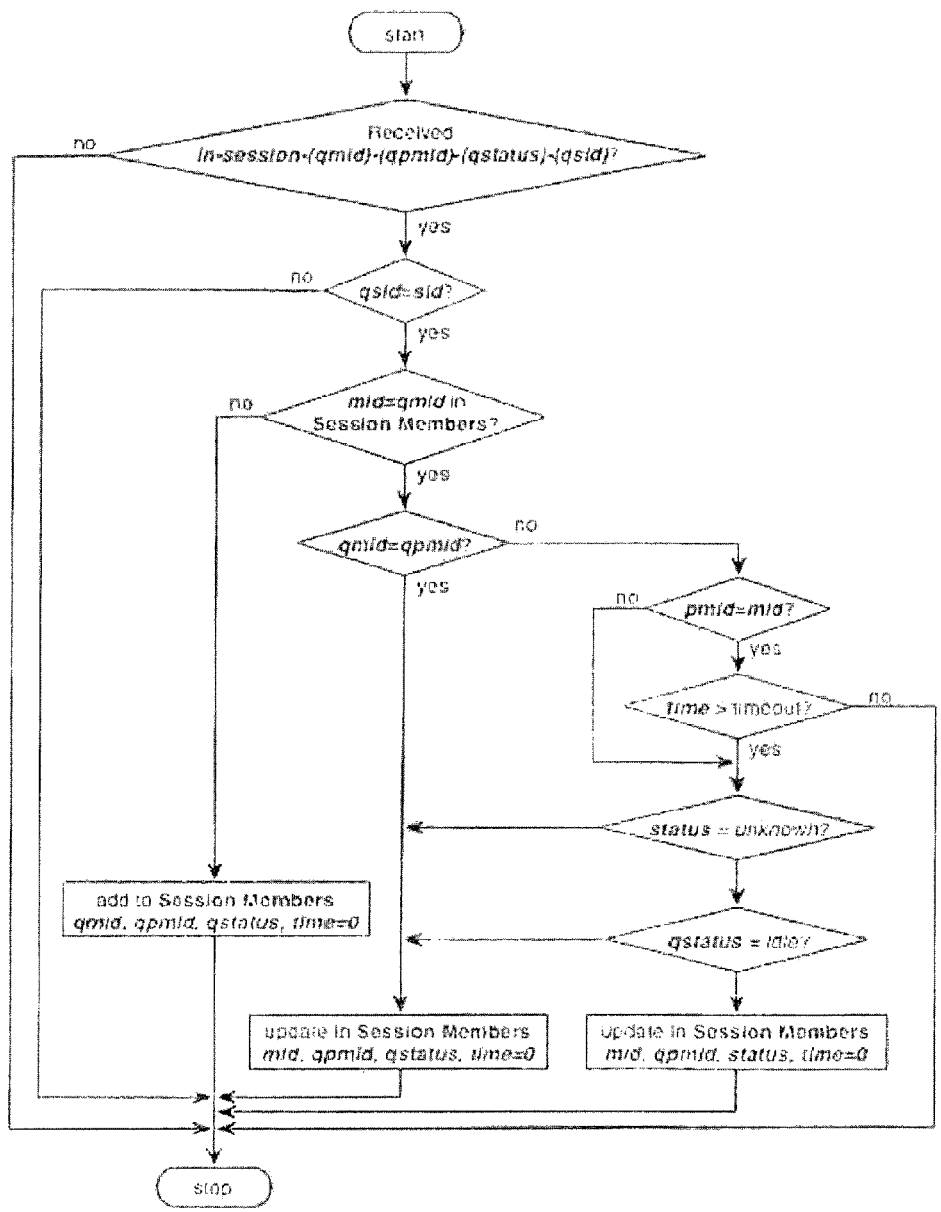
FIG. 10 is a more detailed flow diagram of the "Update Session Members" step in the Session Manager flow diagram of FIG. 8.
Figure 11:
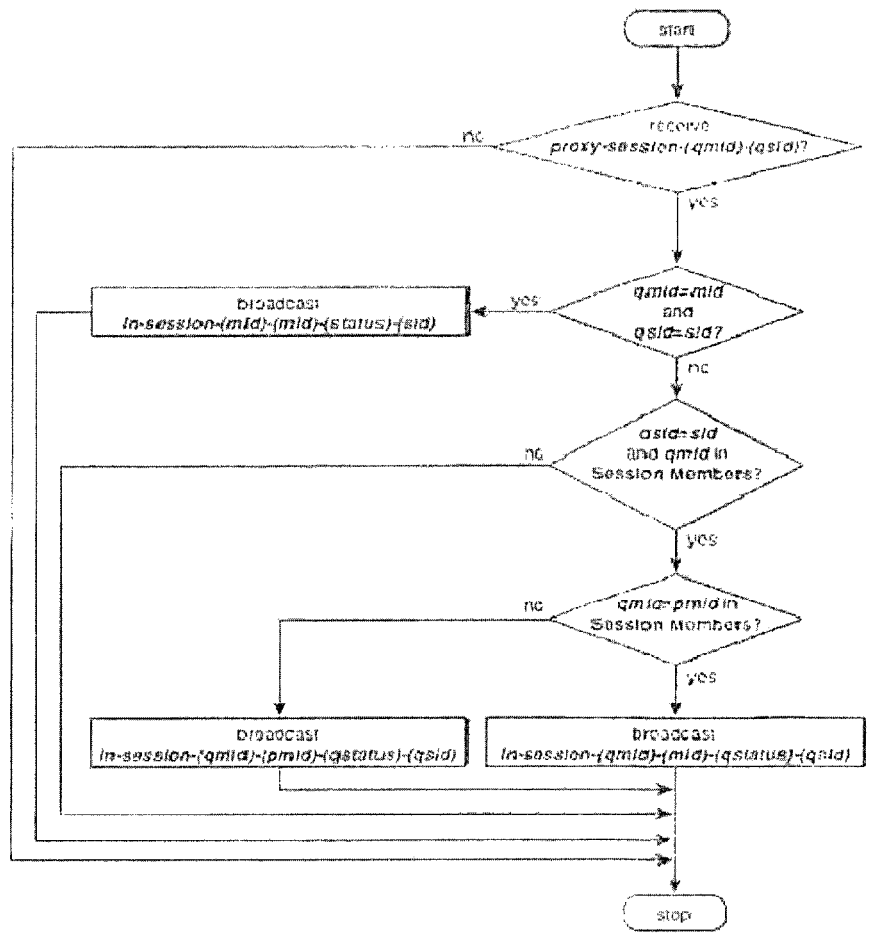
FIG. 11 is a more detailed flow diagram of the "Service Proxy Requests" step in the Session Manager flow diagram of FIG. 8.
Figure 12:
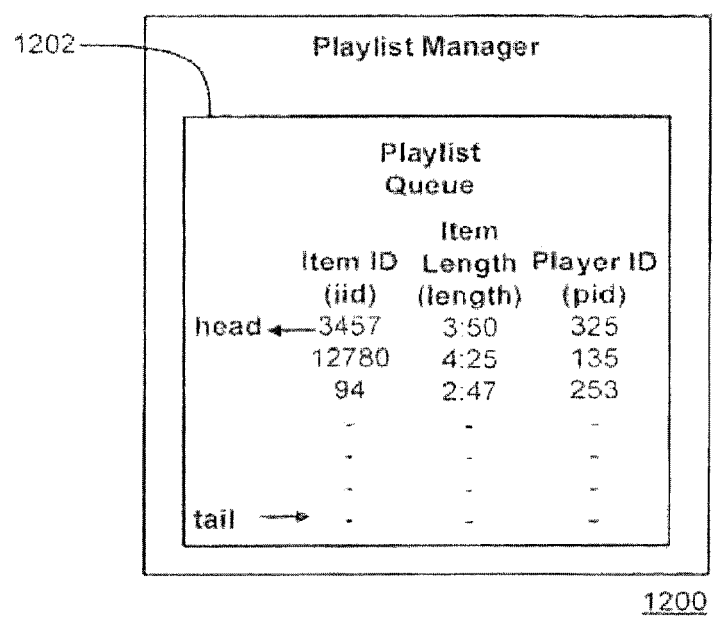
FIG. 12 depicts a Playlist Queue screen of a Playlist Manager, which presents the relevant details of the data structures in the Playlist Manager subcomponent of the Device Manager of one embodiment.

Subfunction 806 may maintain knowledge of the other media players in the session by repetitively executing the three processes 810, 812, and 814 shown in FIG. 8, each of which are shown in greater detail in FIGS. 9-11, respectively. The "Prune Session Members" process 810 scans the session manager state data structure 702 and removes entries corresponding to media players from which the subject media player has not received an affirmative indication that they are still in the session, and therefore are inferred to have left the session. The "Update Session Members" process 812 processes messages from other media players that are therefore inferred to have joined or remained in the session. Finally, the "Service Proxy Requests" process 814 responds to requests from other media players if the session manager state data structure 702 includes an entry for a media player known directly to the subject media player that has been only known to another media player by proxy via the subject media player.

Describing each of the processes 810, 812, and 814 in turn, the "Prune Session Members" process 810 (FIG. 9) may perform one of the following three operations on the entry for each media player i in the session manager data structure 702.

1) The entry is removed if the time[i] that the media player was last affirmatively known to the subject media player exceeds an implementation specified timeout value. A "proxy-session-mID-sID" query is then broadcast to request if the media player corresponding to the removed entry is still known to another media player in the session.

2) A "proxy-session-mID-sID" query is broadcast to request if the media player is still known to another media player in the session, and the media player entry status has been marked as "cued" (meaning that the media player was scheduled to perform a track by the Playlist Manager process described below), and if one of the two following conditions exist: a) If the time[i] that the media player was last affirmatively known to the subject media player exceeds an implementation specified cued timeout value, meaning that the subject media player did not receive an indication that the media player corresponding to the entry transmitted a state change out of the cued state; b) If the time[i] that the media player was last affirmatively known to the subject media player does not exceed an implementation specified cued timeout value, but the media player corresponding to the entry is only known to the subject media by proxy via another media player in the session. In this case, the subject media player would only learn of a state change by the media player corresponding to the entry if that state change is broadcast by the proxy media player in response to the "proxy-session-mID-sID" query.

3) Nothing is done to the entry for the media player in the event neither of the above conditions apply.

The "Update Session Members" process 812 (FIG. 10) receives the "in-session-mID-pmID-status-sID" messages broadcast by the session manager and the "Service Proxy Requests" process 814 and updates the session manager state data structure 702. The process assumes that the protocol of the network over which the media players communicate buffers all "in-session-mID-pmID-status-sID" messages until they can be processed. Each received message in which the message sID matches the ID of the session is processed in one of the five following ways:

1) An entry corresponding to the media player with the mID of the message is added to the Session Manager state data structure if no entry with mID as the ID already exists.

2) If the mID and the pmID of the message match, implying that this message was transmitted by a media player that is now directly known to the subject media player, the entry in the data table for the media player with mID is updated with the status from the message. The time since the media player with mID was last affirmatively known to the subject media player may be reset to 0 seconds.

3) The entry in the data table for the media player with mID may be updated with the proxy media player pmID and the status from the received "in-session-mID-pmID-status-sID" message if several conditions apply simultaneously: a) the received message is a proxy message (miID, pmID differ); b) the media player referenced by the message is currently known to the subject media by proxy (mID, pmID for the entry in the Session Manager state data structure differ) or the time since the media player with mID was last affirmatively known to the subject media player has exceeded an implementation timeout value; and c) the status of the referenced media player is unknown or the status in the message is idle. The time since the media player with mID was last affirmatively known to the subject media player may be reset to 0 seconds.

4) The entry in the data table for the media player with mID may be updated with just the proxy media player pmID from the received "in-session-mID-pmID-status-sID" message if several conditions apply simultaneously: a) the received message is a proxy message (miID, pmID differ); b) the media player referenced by the message is currently only known to the subject media by proxy (mID, pmID for the entry in the Session Manager state data structure differ) or the time since the media player with mID was last affirmatively known to the subject media player has exceeded an implementation timeout value; and c) the status of the referenced media player is known and the status in the message is not idle. The time since the media player with mID was last affirmatively known to the subject media player may be reset to 0 seconds.

5) Nothing is done if the received "in-session-mID-pmID-status-sID" is a proxy message (miID, pmID differ), the media player referenced by the message is currently known to the subject media player (mID, pmID for the entry in the session manager state data structure match), and the time since the referenced media play was last affirmatively known to the subject media player does not exceed an implementation-defined timeout value.

The "Service Proxy Request" process 814 (FIG. 11) provides information about any media players the subject media player affirmatively knows to the other media players in the session in response to the "proxy-session-mID-sID" request messages, which may have been broadcast by the "Prune Session Members" process 810 of any media player in the session identified by sID. As with the "Update Session Members" process, this process assumes that the protocol of the network over which the media players communicate buffers all "proxy-session-mID-sID" messages until they can be processed. Each received "proxy-session-mID-sID" message in which the message sID matches the ID of the session may be processed in one of the four following ways:

1) An "in session-mID-pmID-status-sID" message is broadcast, where pmID=mID and the status is that of the subject media player, if the subject media player corresponds to the mID of the request.

2) An "in session-mID-pmID-status-sID" message is broadcast, where pmID=mID, and the mID and status parameters are those in the session manager state data structure 702 for the media player referenced by the query, if the media player mID of the query is known affirmatively to the subject media player (mID of the query and pmID in the state manager state data structure match).

3) An "in session-mID-pmID-status-sID" message is broadcast, where the pmID and status parameters are those in the session manager state data structure 702 for the media player referenced by the query, if the media player mID of the query is only known to the subject media player by proxy (mID of the query and pmID in the State Manager state data structure differ).

4) Nothing is broadcast if the "proxy-session-mID-sID" message does not reference the subject media player or a media player in the Session Manager state data structure 402 known to the subject media player.

Figure 13:
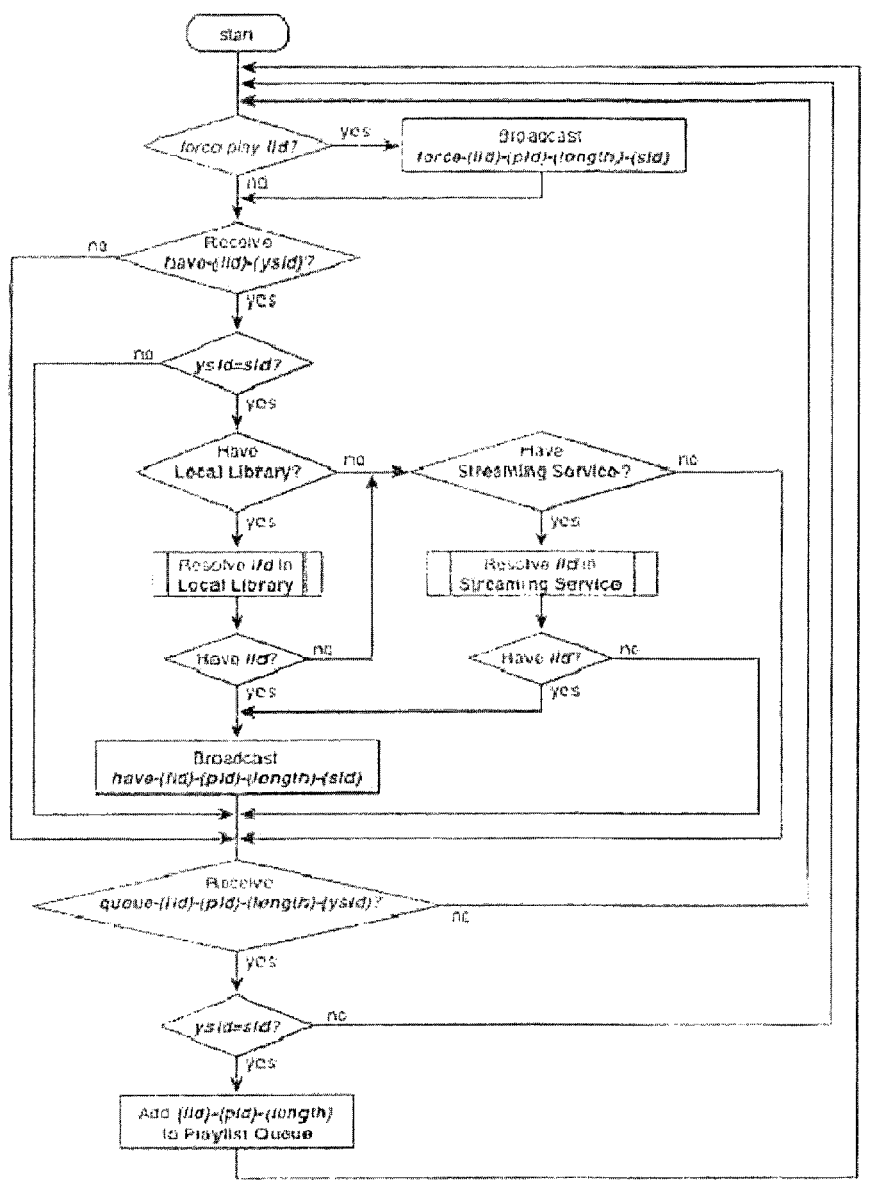
FIG. 13 is a flow diagram showing the operation of the Playlist Manager subcomponent of the Device Manager of one embodiment.
Figure 14:
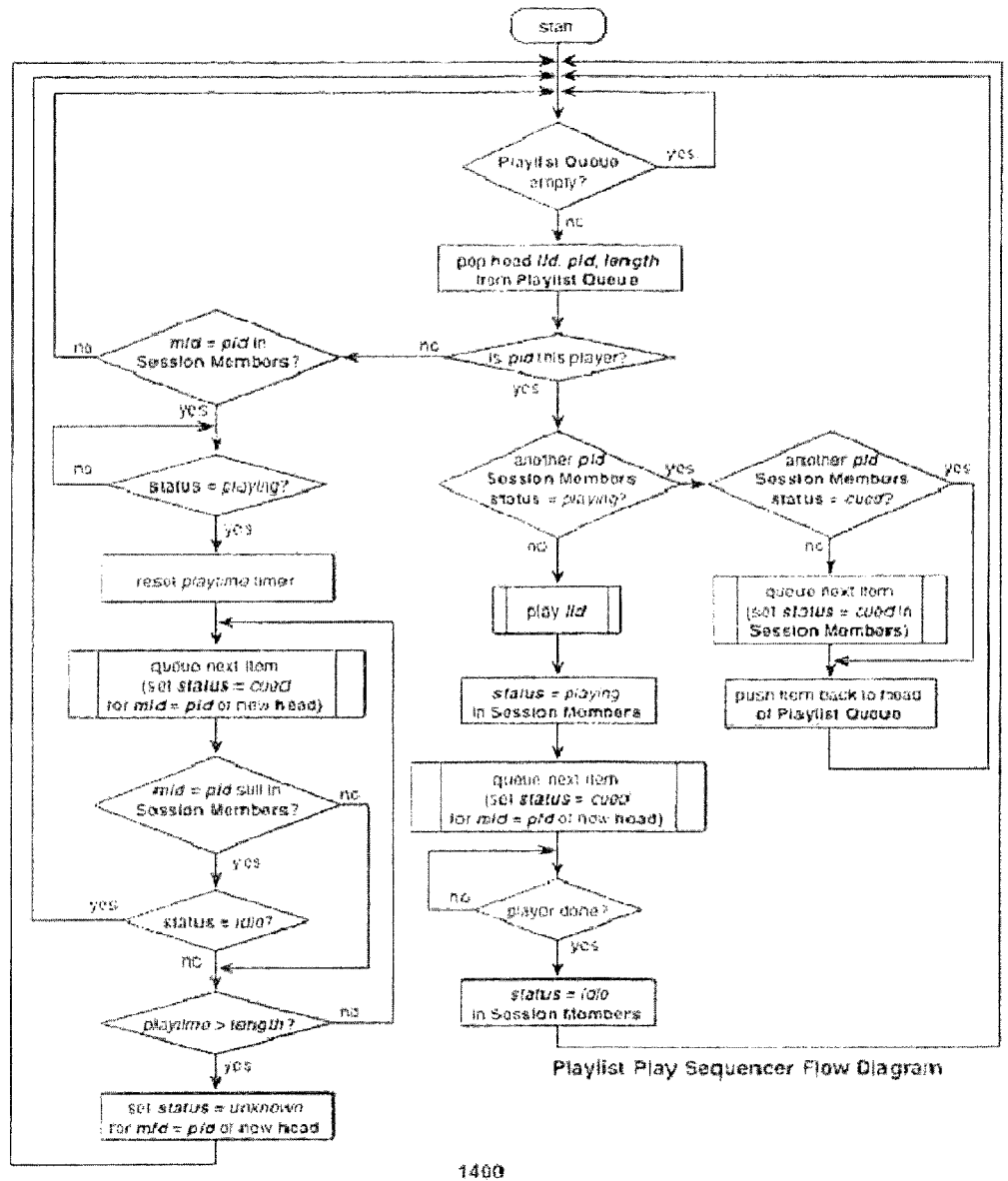
FIG. 14 is a flow diagram showing the operation of the Playlist Play subcomponent of the Playlist Manager of a Media Player Client embodiment.

The Playlist Manager of an individual media player device may consist of two major subfunctions: First, the "Playlist Queue Updater" process 1300, as depicted in FIG. 13, which negotiates the sharing of playlist information between the media playing devices in the session. And, second, the "Playlist Play Sequencer" process 1400, as depicted in FIG. 14, which controls performance of the media items by the subject media player.

The Playlist Manager 1200 (FIG. 12) assumes the presence of a single Playlist Builder on a server system in the client-server configuration, or on a privileged peer-to-peer network access system in the peer-to-peer configuration. In peer-to-peer embodiments, the playlist builder could be implemented on the system found in some peer-to-peer networks, which hosts network-level functions, while in other embodiments it could be implemented on one peer system in the network. The "Playlist Queue Updater" may provide the data from the media player to the Playlist Builder that is used in the playlist building process. The Playlist Builder will be described in detail subsequently.

Figure 15:
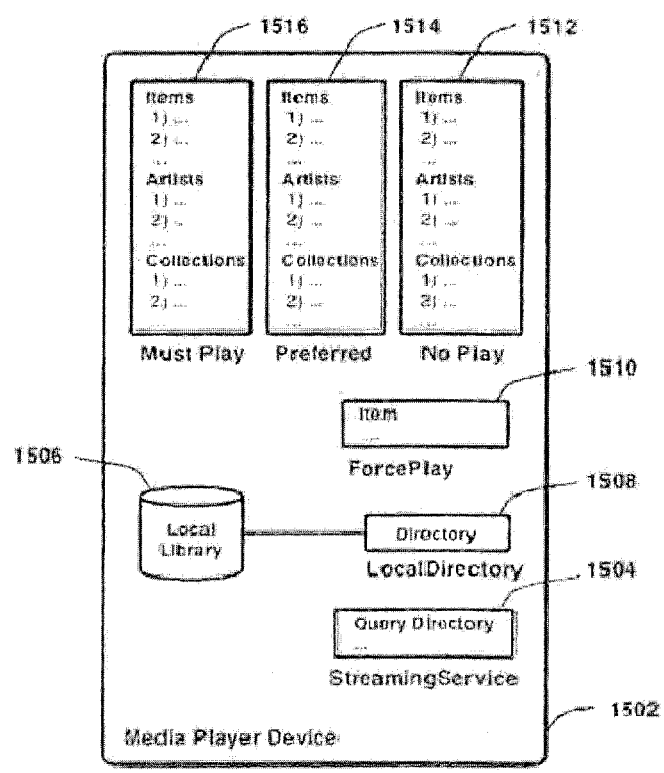
FIG. 15 depicts the relevant data structures in one embodiment of the Media Player Client supporting the Playlist Builder component of the system.

The Playlist Manager 1200 also assumes that the media player makes available several data items relevant to the playlist building process depicted conceptually in FIG. 15. In some embodiments, the media player device 1502 may store media items in a local library 1506, and provide a mechanism for querying the local directory 1508 to determine whether a specific media item is available for performance by the media player. in other embodiments, the media player 1502 may download or stream media items from a remote service over a communication network on demand, and provide a mechanism for querying a directory 1504 of media items available from the remote service for performance by the media player. FIG. 15 also depicts several other data items maintained by the media player relevant to the playlist building process, including indication 1510 of a media item that should be preemptively added to the playlist, and lists of items 1512, 1514, and 1516 of items that user does not want added, added preferentially, and added if at all possible, respectively, to the playlist.

FIG. 13 presents a top-level flow diagram of the "Playlist Queue Updater" process 1300. As the figure illustrates, this may be a repetitive process performed ad infinitum. The "Playlist Queue Updater" first determines if the user of the subject media player has requested that a particular media item be added to the playlist being built, and sends a "force-iid-pid-length-sid" message to the Playlist Builder if so. This message specifies the media item by iID, the pID of the media player (this is the same value as mID used by the Session Queue Updater described previously), the length in time units of the media item, and the sID for the session.

After any user request that a specific media item be added to the playlist has been processed, the "Playlist Queue Updater" then checks if a "have-iID-sID" request message has been received from the Playlist Builder inquiring whether the subject media player can provide a specific media item for the playlist. The process assumes that the protocol of the network over which the media players communicate buffers all "have-iID-sID" request messages until they can be processed. Each received message in which the message sID matches the ID of the session may be processed in one of three following ways:

1) A "have-iID-pID-length-sid" message is broadcast if the subject media player pID has access to the requested media item iID with length "length" from a local library of media items.

2) A "have-iID-pID-length-sid" message is broadcast if the subject media player pID does not have access to the requested media item iID with length "length" from a local library of media items, but does have access to the requested media item from a remote service.

3) No response is broadcast if the media player does not have access to the requested media item.

In some embodiments, the "Playlist Queue Updater" may take into account the user's preferences with regard to media items, as indicated by the lists 1512, 1514, and 1516 in determining whether to supply a "have-iID-pID-length-sid" message in response to a "have-iID-sID" request message. For example, the "Playlist Queue Updater" may not respond to the "have-iID-sID" message even if the requested item is in the catalog 1504 or 1506 of the device if it is also on the "no play" list 1512. Similarly, the "Playlist Queue Updater" may respond optionally according to some statistical or other criteria if the item is on the "preferred" list 1514. And the "Playlist Queue Updater" may always respond if the item is on the "must play" list 1514.

The last step in an iteration of the "Playlist Queue Updater" flow diagram processes at least one "queue-iID-pID-length-sID" message from the Playlist Builder, if any have been received. The process assumes that the protocol of the network over which the media players communicate buffers all "queue-iID-pID-length-sID" messages until they can be processed. In some embodiments, the "Playlist Queue Updater" may process only a single "queue-iID-pID-length-sID" message per iteration by adding an entry to the Playlist Queue data structure in the Playlist Manager, consisting of the iID, length, and pID items from the message. In other embodiments, it may process multiple or all pending "queue-iID-pID-length-sID" messages.

In one embodiment, performance of the playlist is, in effect, directed by the Playlist Builder. As described later, the Playlist Builder may broadcast a "queue-iId-pID-length-sid" message to all the media players in the session requesting that media item be added to the Playlist Queue data structure 1202 in the Playlist Manager 1200. The Playlist Builder sends this message at the actual time the media item should be performed and the media player accepts that message as a command to perform the specified media item. In a variant of this embodiment, the Playlist Builder may send this message just sufficiently before the time the media item should be performed to allow the media item to perform any processing required to initiate the performance by the time the performance is to start.

In another embodiment, the "Playlist Play Sequencer" process 1400 of the Playlist Manager 1200 shown in FIG. 14 locally coordinates the performance of the items on the playlist that are actually performed by the subject media player with the performance of the other media items on the playlist by the appropriate media players. All media players in the session may have a copy of the Playlist Queue 1202. This copy may be imperfect: It could be missing items at the head of the queue that were put on the playlist before the subject media player joined the session, or in the middle of the queue due to communication failures. The Playlist Play Sequencer may cause the subject media player to synchronize its performances of individual media items with the performance of media items by other media players in the session in the presence of these possible gaps in the playlist.

The "Playlist Play Sequencer" 1400 may be an iterative process which achieves the synchronized performance in the presence of gaps by processing the item at the head of the Playlist Queue 1202 in, for example, one of the three following ways:

1) If the pID of the media item at the head of the queue is not the pID of the subject media player, corresponding to the left branch of the flow diagram, the "Playlist Play Sequencer" essentially just idles, monitoring the status of the media player with mID=pID in the Session Members state data structure 702 until it is inferred that the media item has been performed. The subject media player infers the media item has been performed when either a transition from played to idle is observed, or the value of the local playtime timer exceeds the performance length of the media item.

2) If the pID of the media item at the head of the queue is the pID of the subject media player, and the Session Members state data structure 702 does not include an entry for another media player with the status value playing, corresponding to the middle branch of the flow diagram, the "Playlist Play Sequencer" plays the media item. The status of the subject media player is set to playing while the item is being performed, and then set back to idle after the performance is finished to signal the performance to the other media players in the session.

3) If the pID of the media item at the head of the queue is the pID of the subject media player, but the Session Members state data structure 702 includes an entry for another media player with the status value playing, corresponding to the right branch of the flow diagram, the performance of the media item is postponed. The "Playlist Play Sequencer" repeatedly traverses this branch of the flow diagram until no other media player has the status value cued, and then sets the status value for the subject media player to cued. On the next iteration the "Playlist Play Sequencer" takes the middle branch of the flow diagram and performs the media item as described above.

As previously described, the Playlist Manager of the Device Manager in each media player device may assume the existence of an autonomous Playlist Builder on the server system in the client-server configuration, or on a privileged peer-to-peer network access system in the peer-to-peer configuration. In peer-to-peer embodiments, the playlist builder could be implemented on the system found in some peer-to-peer networks which hostsnetwork-level functions, while in other embodiments it could be implemented on one peer system in the network.

Figure 16:
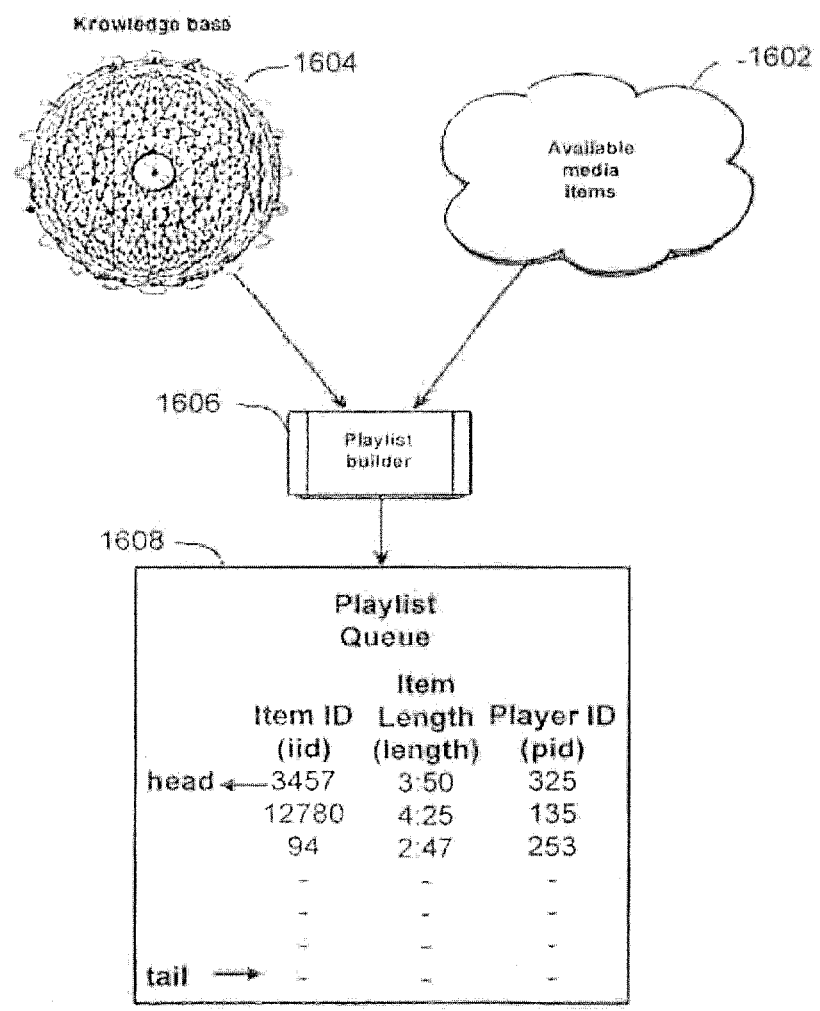
FIG. 16 presents a conceptual diagram of the playlist building function of one embodiment.

FIG. 16 depicts how the Playlist Builder 1606 draws on a knowledge base 1604 of information about media items to compose a playlist of media items in the playlist queue 1608 from the pool of media items 1602 available to the media playing devices in the session.

Figure 17:
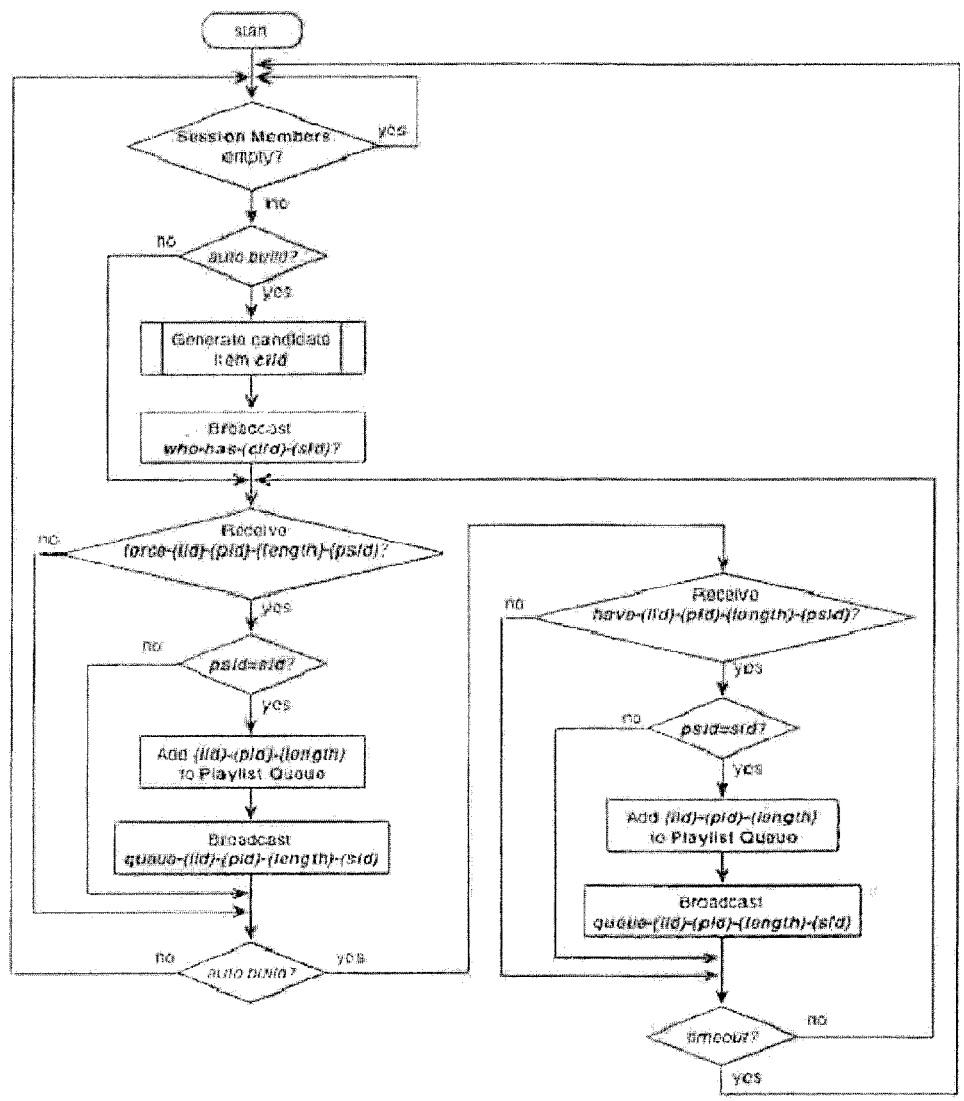
FIG. 17 is a flow diagram of the operation of one embodiment of the Playlist Builder component of the system.

FIG. 17 is a flow diagram of the playlist builder 1606 process. The process assumes the availability of a method for generating the IDs of media items that are candidates for inclusion in the playlist. Candidates may be proposed based on many criteria, including information in the knowledge base 1604, and knowledge of the preferences of the users whose media players are participating in the session.

The "Playlist Builder" may be an iterative process that adds a single media item to the playlist per iteration. Each iteration may include three steps:

1) A candidate media item with ciID is generated based on information in the knowledge base 1604 and/or other criteria. A "who-has-ciID-sID" query is broadcast to all of the media players in the session to determine if any of them has access to the proposed media item.

2) If the Playlist Queue Manager of any of the media players in the session has previously broadcast an unprocessed "force-iID-pID-length-sID" message, the requested media item iID is added to the playlist 2108. The Playlist Builder may broadcast a "queue-iID-pID-length-sID" message to all of the media players in the session, directing that they each add the requested media item to their local playlist that their Playlist Queue Manager is maintaining.

3) After an implementation-determined delay, a determination is made if the Playlist Queue Manager of any of the media players in the session has broadcast an unprocessed "have-iID-pID-length-sID" response message, indicating that a media player in the session has access to the requested media item iID. As one or more of the media players may have access to the requested item, one of those media players is selected either at random, or according to some other criteria, as the media player that will perform that media item and the item is added to the playlist. The Playlist Builder may then broadcast a "queue-iID-pID-length-sID" message to all of the media players in the session directing that they each add the requested media item to their local playlist maintained by their Playlist Queue Manager 1100.

The process assumes that the protocol of the network over which the media players communicate buffers all "force-iID-pID-length-sID" request messages and "have-iID-pID-length-sID" until they can be processed. In any particular embodiment, one or more of each type of message may be processed per iteration. In addition, as the flow diagram indicates, steps 2) and 3) may be repeated a number of times limited by a timeout value to increase the responsiveness of the communications between the Playlist Builder and the media player devices.

The Playlist Builder iterations may be repeated ad infinitum. The playlist is a non-terminating sequence of media items to be performed so long as there is at least one media player in the session. Furthermore, some embodiments may support building playlists consisting solely of media items suggested by users of the media devices, and communicated to the Playlist Builder with the "force-iID-pID-length-sID" request message, by providing an option for setting a option flag to "false" so that the "auto build?" tests in the flow diagram fail.

Still other implementations are disclosed and described with reference to FIGS. 18-26. In these embodiments, playlists of selected media items may be dynamically built from a collection of media items based on the preferences of a temporally-defined group of users with media player devices. Compositional goals and the collection of media items available to meet those goals may be dynamically computed using, for example, the composite taste data for the group as a whole as individual users enter and leave the group.

Some embodiments therefore relate to methods for dynamically creating a playlist of media items responsive to the collective tastes of a temporally-defined group of individuals. Some embodiments also provide for dynamically diversifying the group playlist so that it does not in whole, or in part, unduly reflect the taste of a single member of the group, or a particular subgroup of users within the whole group.

Additional embodiments may provide for a system and method for dynamically building a playlist of media items by using the collective taste preferences of the members of a group to determine compositional goals of the playlist, and then building a group playlist that achieves those compositional goals. The system may derive the compositional goals by analyzing the taste preferences of the current members of the group. Media items available to achieve those goals are typically a subset of the media items that are identified in response to analyzing taste data and may be selected from a collection of media items available to the system. The collection of available media items may be the aggregate of the sub-collections of media items provided by the users or, alternatively, may be a pre-existing set of media items stored, for example, in a central database.

In a preferred implementation of the system, three primary processes are provided. The first process keeps track of users as they enter and/or leave the group by starting or ending communications with the system using, for example, individual networked communication devices. Example embodiments include Bluetooth® devices and other devices communicating in an ad-hoc network of Internet or other network-connected devices using, for example, the Apple Bonjour protocol. Users with individual communication devices may be added to and/or removed from the group by the system as they implicitly or explicitly connect and disconnect from the communication network, which links the individual devices to the computational means for building the group playlist.

As a user enters the group, the system may retrieve the user's taste data. Taste data may be retrieved by, for example, accessing a database of taste data from users known to the system or by requesting taste data directly from the users' communication devices and adding it to the pool of taste data for the group. As a user leaves the group, the system may also be configured to remove that user's taste data from the pool of taste data for the group. In some embodiments in which the media items available for inclusion in a playlist are provided by users and not centrally maintained by the system, the system may maintain a pool of media items available for the current group.

Using the pool of taste data for the group, and the pool of media items available for inclusion on a playlist, the first process may derive compositional goals for the playlist, such as requiring that the values for the selected media items of a specific attribute have a specified distribution. In some embodiments, the first process may also involve selecting a subset of media items from the total pool of media items to be used to build the playlist. This may be accomplished using a media item recommender, such as that described in U.S. patent application Ser. No. 11/346,818 titled "Recommender System for Identifying a New Set of Media Items Responsive to an Input Set of Media Items and Knowledge Base Metrics," {matter 3:2} which is incorporated herein by reference in its entirety. The aforementioned media item recommender may be used to recommend media items responsive to an input set of media items.

The second process may build the composite playlist by selecting media items from the total pool of media items in a manner which causes the evolving playlist to more closely approximate the specified compositional goal as the selected items are added to the playlist. Some implementations of the system may therefore be responsive to the constantly changing group membership. In particular, as users in the group continuously enter and leave the group, the compositional goals and/or the pool of media items available to achieve those goals may continually change. Some embodiments may remove media items from the dynamic playlist as users depart from the group, particularly in those situations where the group members actually contribute the media items to the pool. In such situations, the media items in the pool could be removed from the pool as users leave, such as by physically leaving a proximity or by logging out of a system. It should be understood, however, that such a feature is not necessary in all implementations, since a media item can be skipped if it is no longer available when it is to be performed.

The third process may involve diversifying the group playlist. The diversification process may involve shuffling media items on the list as necessary to ensure that no segment of the playlist is dominated by media items representative of the taste of one or more group members. In some embodiments, additional information about aesthetic properties of the media items might be used to rearrange the order of the media items in the group playlist to achieve specific aesthetic goals. Finally, in cases where there are few users, and therefore for each user the playlist includes a large number of items responsive to the taste of just that user, some embodiments may replace some media items with additional media items. These additional or supplemental media items may not be provided by any of the members in the group, and may be selected according to a diversifying criteria to bring more variety to the group playlist.

Figure 18:
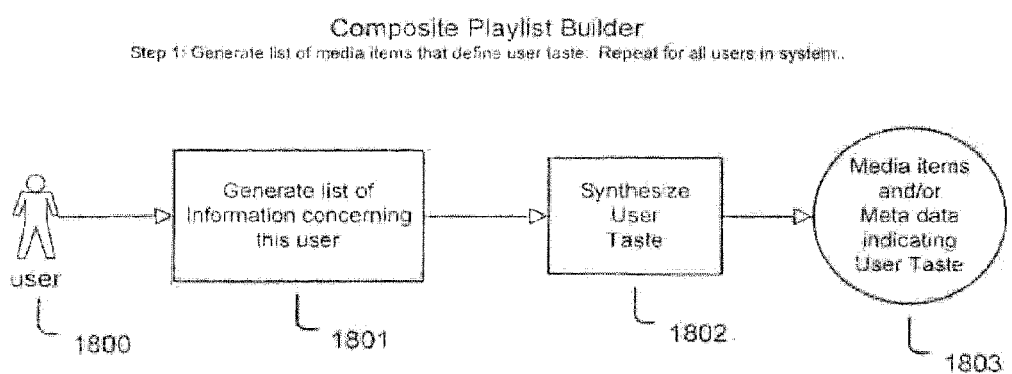
FIG. 18 is a diagram of a process for generating a list of media items that define a user taste.
Figure 19:
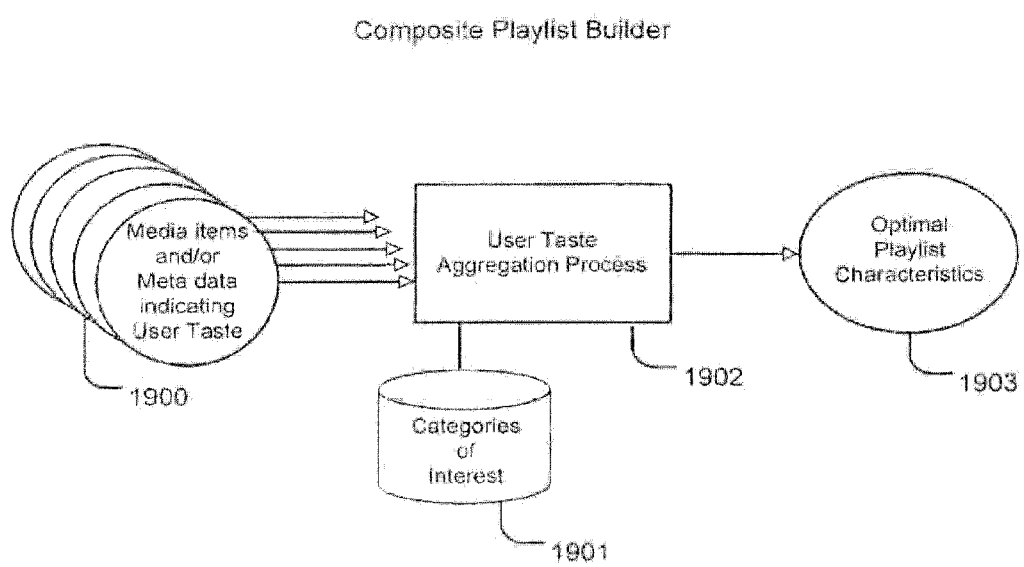
FIG. 19 is a diagram of a process for computing aggregate playlist goals and a list of desired categories.
Figure 20:
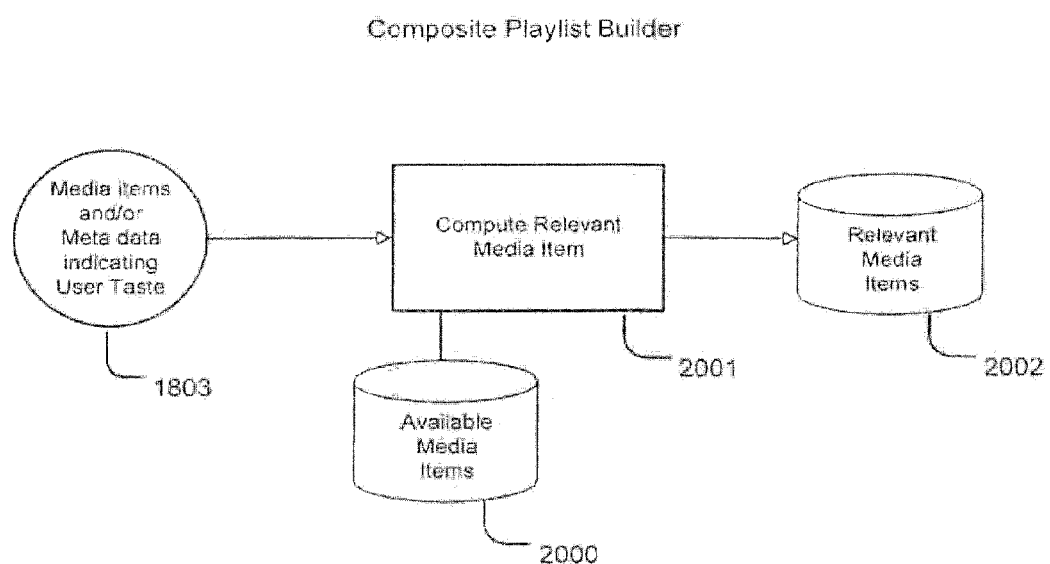
FIG. 20 is a diagram of a process for computing relevant media items for each user from total available media items.

One embodiment of the system may implement the processes detailed in FIGS. 18-20. This embodiment may be analogized to the automated evolution of a jukebox. Whereas a jukebox supplies local music and requires explicit user interaction from the user to pick desired music, these embodiments automatically build playlists based on previously collected data about users that are proximal (either physically or virtually) to the system.

In describing the embodiment of FIGS. 18-20 below, a process of adding users to the system will be described first, then a process for removing users, and finally the overall playlist construction process is described, including how the process uses information to build a targeted playlist that leverages knowledge of proximal users for building a playlist.

Figure 24:
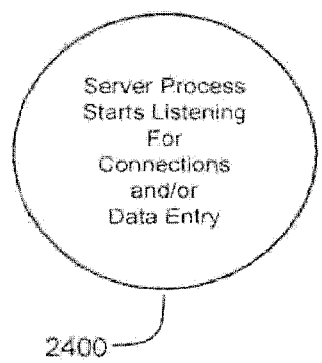
FIG. 24 represents a step of a user addition process for detecting new users.

In order for the system to "narrowcast" (i.e., to target content to a specific set of users) a playlist for proximal users, a mechanism may be provided to allows for discovery/detection of proximal users. In one embodiment, a server process 2400 (as shown in FIG. 24) may be provided using, for example, Bluetooth® technology to allow users to "log in" to the system. Users who are "logged in" to the system are considered proximal users, regardless of their physical proximity to the other users or server. In some embodiments, all proximal users immediately begin to affect the playlist being constructed, which will be discussed in greater detail later. It will be obvious to one of ordinary skill in the art that Bluetooth® is just one of many data discovery/entry mechanisms that could be used to add users to the system. Other embodiments may include explicit text entry from users, or even be a zero-configuration protocol such as Apple's BonJour protocol.

In step 1 of one implementation of a Bluetooth® user addition process, a Bluetooth® server with a predetermined service UUID (Universally Unique Identifier) is provided. The Bluetooth® specification uses UUIDs to identify services uniquely across many devices. By using a UUID, a Bluetooth® client is able to detect a specific service on a remote server.

Figure 25:
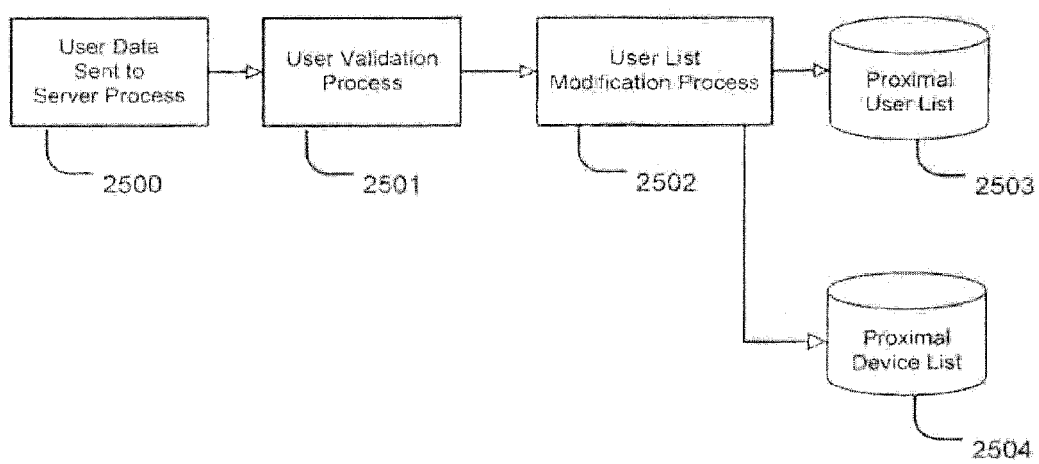
FIG. 25 represents another step of a user addition process in which new users are added to the system and source device information is stored.

In step 2, once a client Bluetooth® process has connected with the system's Bluetooth® server 2400, the client transmits user information to the server process 2400, as shown in FIG. 25 at 2500. The server process 2400 will then attempt to validate the user information, as indicated at 2501. If the user validation process 2501 fails, then the user is rejected and is not added to the proximal user list 2503 or the proximal device list 2504 by the user list modification process 2502. If the user validation process 2501 succeeds, then the user is added to the proximal user list 2503 and the user device is added to the proximal device list 2504. The means for entry of the user and the user device to the appropriate lists may vary, as would be understood by one of ordinary skill in the art.

Figure 26:
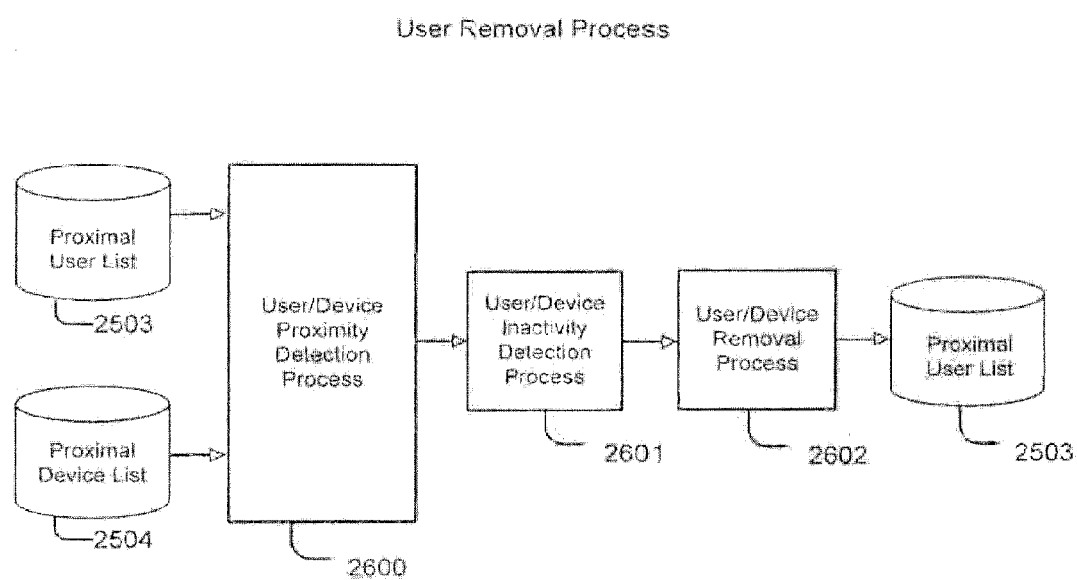
FIG. 26 is a diagram of a process for removing users from the system.

In order to provide real-time narrowcasted playlist content, the system preferably updates and maintains the contents of the proximal user list 2503 and proximal device list 2504 on a regular basis. At the same time, the system may be configured to reduce the chance that users are erroneously moved from either list. These concerns may be addressed by using a User/Device Proximity Detec-tion Process 2600, as shown in FIG. 26, to identify which users are proximal to the system. Process 2600, like various other processes, may be implemented using Bluetooth® technology. The system may be able to determine when users are no longer proximal by, for example, detecting proximal devices and mapping the proximal device list 2504 to the proximal user list 2503.

After a user has been discovered to no longer be proximal, a User/Device Inactivity Detection Process 2601 may be used to begin considering whether a user should be removed from the proximal user list 2503 and the user's device removed from the proximal device list 2504. The User Device User/Device Inactivity Detection Process 2601 may be implemented as a time-based process. The system may be configured to remember the time when a user first became classified as non-proximal. Then, for example, if a specific time limit has been reached and the non-proximal user is identified as still being non-proximal, the user may be removed from the proximal user list 2503, along with the user's device from the proximal device list 2504, by the User/Device Removal Process 2602. If a user is found to be proximal by the User/Device Proximity Detection Process 2600 before the time limit of the User/Device Inactivity Detection Process 2601 is reached, then the user and their device will be left on the appropriate lists 2503/2504. It will be apparent to one skilled in the art that specific implementations of the aforementioned system may, but need not, rely on the use of Bluetooth® or a time-based user removal strategy.

The Composite Playlist Builder process may rely on the User Addition/Removal processes described above in order to determine which users to which a playlist is to be narrowcasted. In one implementation, the Composite Playlist Builder process may first generate a list of media items that define a user taste, and then repeat this step for all proximal users in the system.

As shown in FIG. 18, the process of generating a list of media items that define user taste may be accomplished by examining the users 1800 logged into the system and using information—i.e., media item taste data—to synthesize user taste, as shown at 1802. The media item taste data may be gathered by the system contemporaneously or, alternatively, it may be compiled into a list or database from previously gathered media item taste data. Either of the foregoing may be represented by step 1801 in FIG. 18. A list of media items and/or media item metadata (collectively "media data items") that contains information about the music that should be narrowcasted to user 1800 may then be generated, as indicated at 1803. It should be noted that it is not necessary to have any users logged into the system in order for a group playlist to be generated. Preconfigured goals can be used when no/few users or otherwise insufficient data is available to the system. This process may then be repeated for each user 1800 who is logged into the system.

The data in one embodiment may be cached to enable quick lookup. As will be demonstrated in other steps, the data which represents user taste may also provide the foundation from which other steps derive information. In some embodiments, user taste may be synthesized by first obtaining a set of the tracks that a user has listened to recently and/or those that a user has ranked highest. Of course, it will be obvious to those skilled in the art that there are many different ways to synthesize user taste based on collected user taste data.

As a second process of one implementation, aggregate playlist goals may be computed based on results of the first process and/or on a list of desired categories. Note that there will be typically be one set of input media data items for each user.

In order to compute aggregate playlist goals, each set of media items and/or metadata that indicates user taste 1900, and/or a predetermined or computed set of categories of interest 1901, may be used as input to a User Taste Aggregation Process 1902, as shown in FIG. 19. User Taste Aggregation Process 1902 may be used to create a set of optimal playlist characteristics 1903 for a group playlist that is intended to be narrowcasted to the proximal users. In certain embodiments, media items and/or metadata that are representative of more than one user's taste may not be viewed as duplicative. This feature may allow media items and/or metadata that are common between multiple users to be given increased levels of importance by the User Taste Aggregation Process 1902. The User Taste Aggregation Process 1902 may accept both user taste 1900 and desired categories of interest 1901 as input. Categories of interest 1901 are often (but not required to be) metadata indicators that indicate the set of metadata to be used in computing the optimal playlist characteristics 1903 for a narrowcast playlist targeted at a particular group of users.

One embodiment uses a category set 1901 that comprises a genre. Such a system may compute the frequency distribution of genres in the play histories retrieved for each connected user. The percentage of each genre may then be used as the optimal genre distribution for the generated group playlist. Of course, a genre is not the only category which could be used for generating a playlist. It should also be understood that a raw frequency distribution is not the only method for computing statistics about any given category. Other similar implementations are not limited to, but could employ, a weighting strategy or voting strategy to determine desired levels of each feature.

After the aggregate playlist goals have been computed, relevant media items for a user may be selected from the pool of available media items. This process may then be repeated for each proximal user in the system.

For example, in FIG. 20, the set of relevant media items 2002 that are associated with a given user may be computed/selected. To do this, a process 2001 for each user may be executed. Process 2001 may accept as input the set of media items and/or metadata that indicates a user's taste 1803 and/or the set of all available media items 2000. Process 2001 may also produce a subset of available media items that are relevant media items for a single user.

In one embodiment, process 2001 may be implemented by using a media item recommender, such as those described in U.S. patent application Ser. No. 11/346,818 titled "Recommender System for Identifying a New Set of Media Items Responsive to an input Set of Media Items and Knowledge Base Metrics," which was previously incorporated by reference. {matter 3:2} Process 2001 may also be augmented by providing the media item recommender with the complete scope of recommended media items from which to recommend a subset of media items. In practice, this may be used to make sure that the recommended media items are available for use by the composite playlist builder application. For example, if there are one-thousand available media items 2000 to choose from, process 2001 may ensure that the relevant media items 2002 are within the one-thousand available media items 2000. This is analogous to a jukebox that has a limited set of media from which to produce a playlist. It should be apparent that the media items available to process 2001 do not need to be resident on the same machine that is executing process 2001. Any media item which is programmatically obtainable via any protocol may be considered an available media item.

Figure 21:
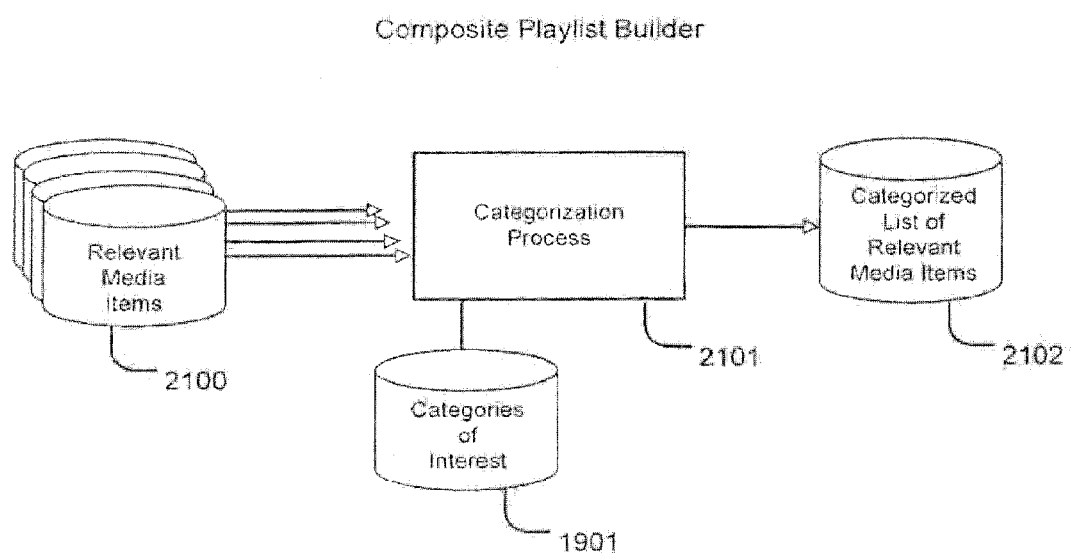
FIG. 21 is a diagram of a process for categorizing relevant media items according to desired attributes.
Figure 22:
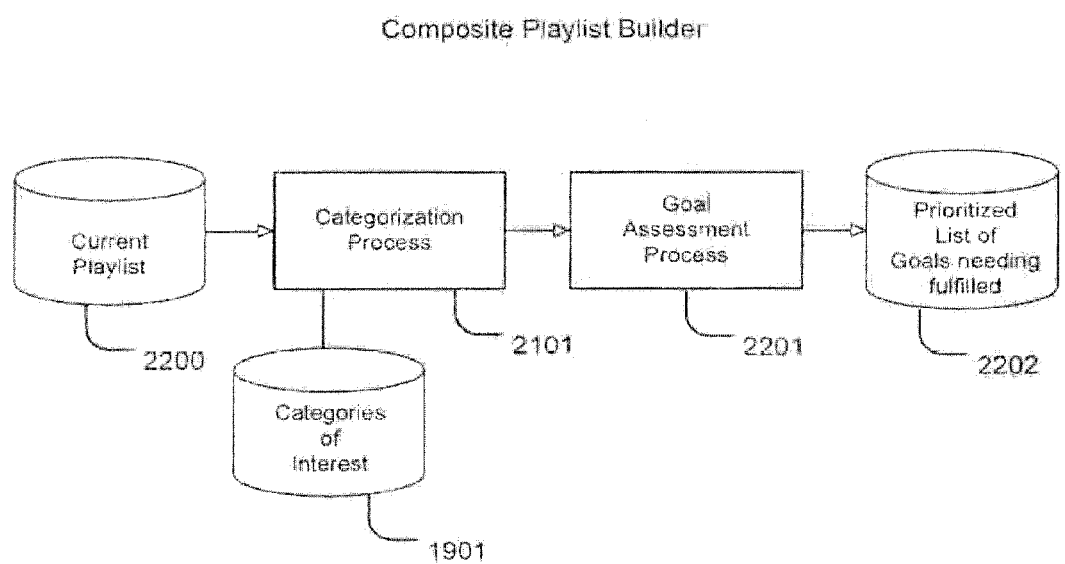
FIG. 22 is a diagram of a process for computing the status of the current group playlist's achievement of compositional goals.
Figure 23:
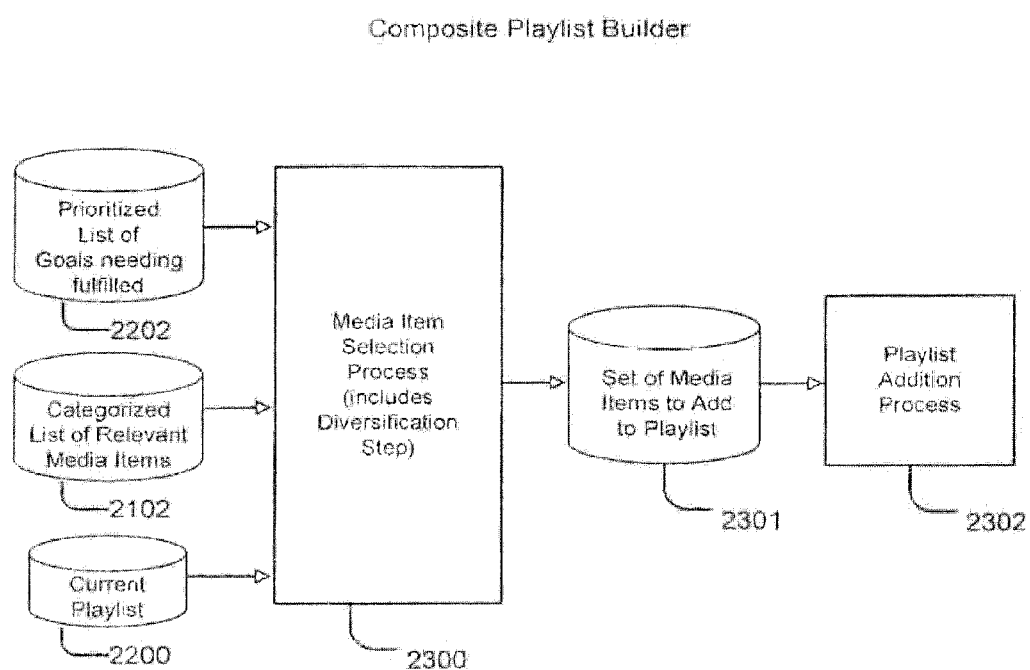
FIG. 23 is a diagram of a process for choosing a set of media items to add to a group playlist based on assessing needs according to compositional goal achievement assessment.

After the relevant media items for each user have been selected from the pool of available media items, the media items may be categorized according to a set of desired attributes. For example, as shown in FIG. 21, the relevant media items 2100 may be categorized via a categorization process 2101 according to the categories of interest 1901 used previously in the user taste aggregation process 1902. Categorization process 2101 may be used to produce a categorized list of relevant media items 2102. This list may enable the overall system to pick one or more media items based on one or more categories of interest 1901.

After the media items have been categorized according to a set of desired attributes, the status of the current group playlist's achievement of goals may be assessed/computed. For example, with reference to FIG. 22, a goal assessment process 2201 may be used, along with categorization process 2101, to produce a prioritized list of goals needing to be fulfilled 2202. The categorization process 2101 may accept the current playlist 2200 and categories of interest 1901 as input. The categorization process 2101 may use the categories of interest 1901 to categorize the media items on the current playlist 2200. The output of the categorization process 2101 may be sent to the goal assessment process 2201 that may be used to determine how close the current playlist 2200 characteristics are to the optimal playlist characteristics 1903. The output of the goal assessment process 2201 may be a prioritized list of goals needing to be fulfilled 2202.

In one embodiment, a frequency distribution of genres may be computed for the categorization process. The goal assessment process may comprise subtracting the achieved genre percentages for the current playlist from the target percentages for the optimal playlist. It can then take the largest value difference as the needed upcoming genre for the playlist. Of course, a variety of other approaches can be used for computing playlist needs.

After the status of the current group playlist's achievement of goals has been assessed/computed, a set of tracks may be selected to add to the group playlist based on assessing current needs for the playlist according to the goal achievement assessment process previously performed. For example, with reference to FIG. 23, a set of one or more media items 2301 are selected for addition to the current playlist 2200 by a playlist addition process 2302. The media item selection process 2300 may accept as input the prioritized list of goals needing fulfilled 2202, the categorized list of relevant items 2102, and the current playlist 2200. The media item selection process 2300 may attempt to fulfill the goals in a prioritized manner in some embodiments, such that the most important goal is fulfilled by picking a media item from the list of relevant items 2102 that best fulfills the goal. If multiple media items could help fulfill a goal, then a media item may be selected at random from the list or in another fashion, such as by some form of tiebreaker process.

The selected media item may also be subjected to a diversification step, which may be used to ensure that the media items being added to the playlist are not too similar to the current playlist contents. In some embodiments, the diversification step may comprise shuffling media items in the group playlist to diversify at least one segment of the group playlist that includes media data items that are overly representative of the tastes of one or more users. The system may be configured such that, in response to determining that the group playlist is dominated by media items representative of the taste of one or more users, removing at least one media data item from the group playlist that corresponds with the taste of the one or more users.

In some embodiments, in order for a media item to be selected and added to the current playlist 2200, it must pass through the diversification process (unless the diversification process eliminates all media items in the pool). Once a sufficient set of media items have been selected, the set of media items 2301 may be sent to a playlist addition process 2302 for addition to the active playlist. The playlist addition process 2302 may have the capability of creating/updating the current playlist 2200 and, in some implementations, initiating playing the media items in the current playlist 2200.

In one embodiment, a media item may be selected from the most needed genre for the current playlist by choosing at random from relevant tracks categorized in the appropriate genre. The diversification step may be used to ensure that no media item is repeated in the group playlist for a predetermined period of time. In other embodiments, the diversification step may also, or alternatively, be used to ensure that no subset of media items—such as artists, albums, genres, etc.—are repeated within a given subset of the group playlist. For example, the diversification step may be used to prevent media items from a particular artist from being repeated within a seven track window within the group playlist. If it is impossible to fulfill the requirements of the diversification process, then a media item may be chosen at random from all media items within the appropriate genre. If multiple genres are identified with equal priority, then the selected media item may be selected from any one of the identified genres, or by some other tie-breaking selection procedure.

Figure 28:
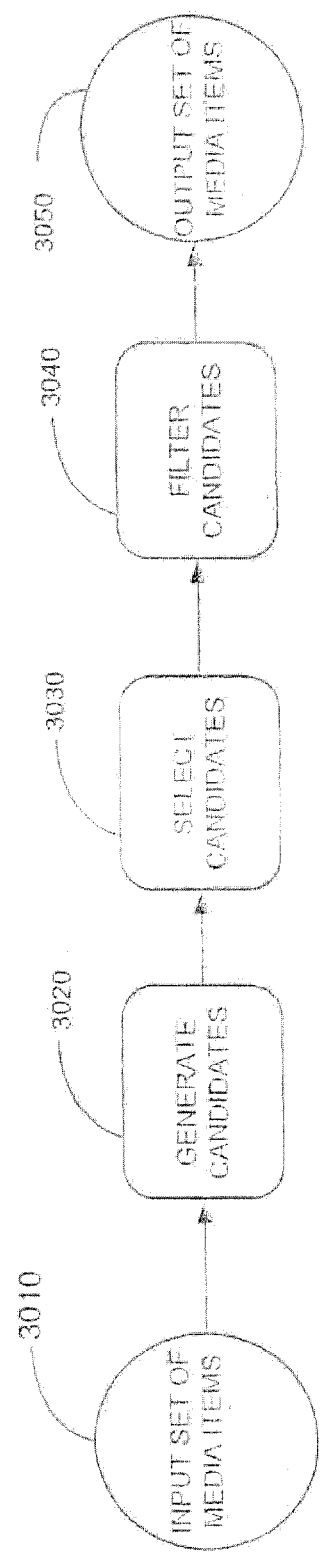
FIG. 28 is a block diagram of one method for selecting a set of media items corresponding to an initial set of media items in accordance with an embodiment of the invention.

One embodiment of the invention is illustrated by the flow diagram shown in FIG. 28. This method accepts an input set 3010 of media items. Usually, this is a partial mediaset, i.e. a set of media items (at lease one item) that a user grouped together as a starting point with the goal of building a mediaset. A first collection of candidate media items most similar to the input media items is generated by process 3020 as follows.

Figure 29:
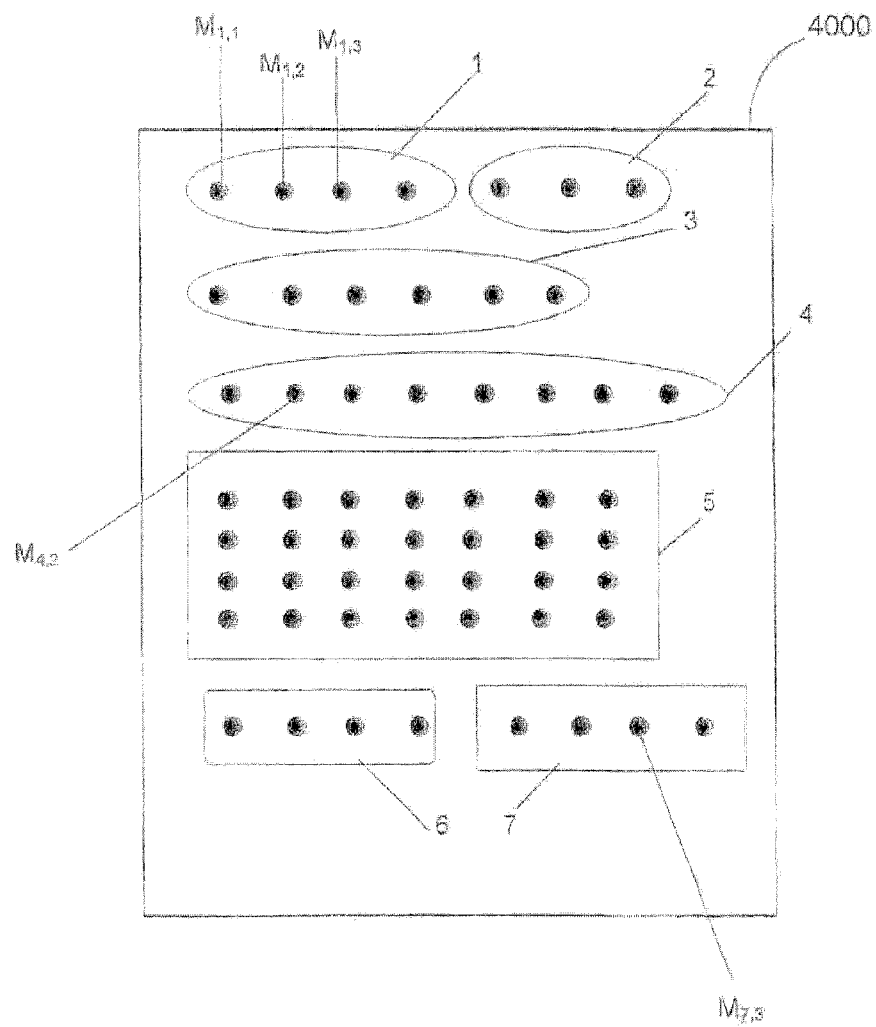
FIG. 29 is a simplified, conceptual diagram of a knowledge base or database comprising a plurality of mediasets.

As a preliminary matter, in a presently preferred embodiment, a pre-processing step is carried out to analyze the contents of an existing knowledge base. This can be done in advance of receiving any input items. As noted above, the knowledge base comprises an existing collection of mediasets. This is illustrated in FIG. 29, which shows a simplified conceptual illustration of a knowledge base 4000. In FIG. 29, the knowledge base 4000 includes a plurality of mediasets, delineated by rectangles [or ovals] and numbered 1 through 7. Each mediaset comprises at least two media items. For example, mediaset 2 has three items, while mediaset 7 has five items. The presence of media items within a given mediaset creates an association among them.

Pre-processing analysis of a knowledge base can be conducted for any selected metric. In general, the metrics reflect and indeed quantify the association between pairs of media items in a given knowledge base. The process is described by way of example using the co-concurrency metric mentioned earlier. For each item in a mediaset, the process identifies every other item in the same mediaset, thereby defining all of the pairs of items in that mediaset. For example, in FIG. 29, one pair in set 1 is the pair M(1,1)+M(1,3). Three pairs are defined that include M(1,1). This process is repeated for every mediaset in the knowledge base, thus every pair of items that appears in any mediaset throughout the knowledge base is defined.

Next, for each pair of media items, a co-concurrency metric is incremented for each additional occurrence of the same pair of items in the same knowledge base. For example, if a pair of media items, say the song "Uptown Girl" by Billy Joel and "Hallelujah" by Jeff Buckley, appear together in 42 different mediasets in the knowledge base (not necessarily adjacent one another), then the co-concurrency metric might be 42 (or some other figure depending on the scaling selected, normalization, etc. In some embodiments, this figure or co-concurrency "weight" may be normalized to a number between zero and one.

Figure 27A:
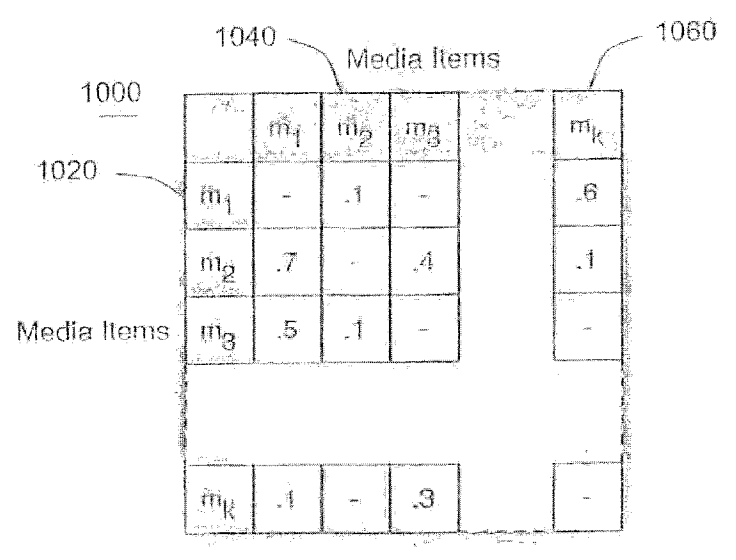

Referring now to FIG. 27A, matrix 1000 illustrates a useful method for storing the metric values or weights for any particular metric. Here, individual media items in the knowledge base, say $m_1, m_2, m_3 \ldots m_k$ are assigned corresponding rows and columns in the matrix. In the matrix, the selected metric weight for every pair of items is entered at row, column location x,y corresponding to the two media items defining the pair. In FIG. 27A, the values are normalized.

Now we assume an input set of media items is received. Referring again to process step 302, a collection of "candidate media items" most similar to the input media items is generated, based on a metric matrix like matrix 1000 of FIG. 27A. For instance, for each media item, say (item $m_2$) in the input set 3010, process 3020 could add to a candidate collection of media items every media item ($m_1, m_3 \ldots m_k$ in FIG. 27A) that has a non-zero similarity value, or exceeds a predetermined threshold value, in the corresponding row 1020 of metric matrix 1000 for the media item $m_2$, labeling each added media item with the corresponding metric value (0.7, 0.4 and 0.1, respectively). See the edges in FIG. 27B. For each media item in the input set of size m, process 3020 selects n media items as candidates; thus the aggregation of all the candidates produces a set of at most m*n media items.

Process 3030 receives the candidate set from process 3020 which contains at the most m*n media items. This component selects p elements from the m*n items of the candidate set. This selection can be done according to various criteria. For example, the system may consider that the candidates should be selected according to the media item distribution that generated the candidate set. This distribution policy may be used to avoid having many candidates coming from very few media items. Also, the system may consider the popularity of the media items in the candidate set. The popularity of a media item with respect to a knowledge base indicates the frequency of such media item in the mediasets of the knowledge base.

Finally, from the second collection of [p] media items, a third and final output set 3050 of some specified number of media items is selected that satisfy any additional desired external constraints by a filter process 3040. For instance, this step could ensure that the final set of media items is balanced with respect to the metrics among the media sets of the final set. For example, the system may maximize the sum of the metrics among each pair of media items in the resulting set. Sometimes, the system may be using optimization techniques when computation would otherwise be too expensive. Filtering criteria such as personalization or other preferences expressed by the user may also be considered in this step. In some applications, because of some possible computational constraints, these filtering steps may be done in the process 3030 instead of 3040. Filtering in other embodiments might include genre, decade or year of creation, vendor, etc. Also, filtering can be used to demote, rather then remove, a candidate output item.

Figure 27B:
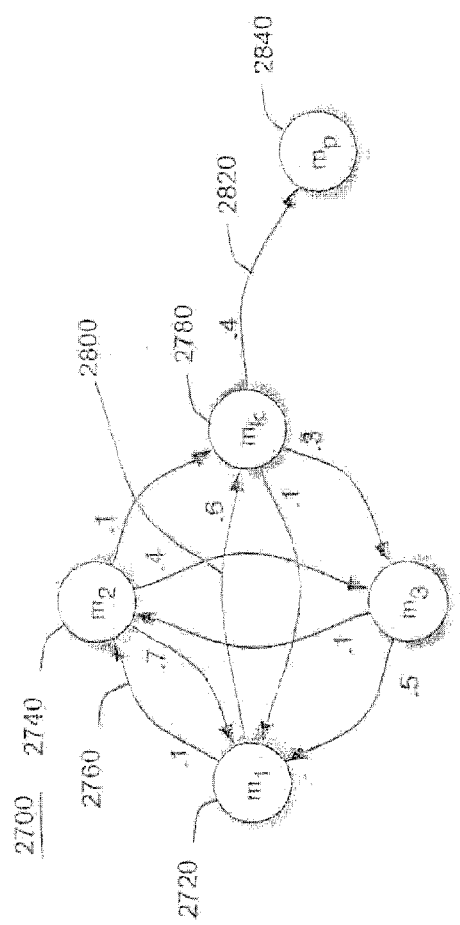
FIG. 27B provides a weighted graph representation for the associations within a collection of media items. Each edge between two media items is annotated with a weight representing the value of the metric for the similarity between the media items.

In another embodiment or aspect of the invention, explicit associations including similarity values between a subset of the full set of media items known to the system, as shown in graph form in FIG. 27B, may be used. To illustrate, if the similarity value between a first media item 2720, generally denoted below by the index i, and a second media item, say 2840, generally denoted below by the index j, is not explicitly specified, an implicit similarity value can instead be derived by following a directed path such as that represented by edges 2800 and 2820 from the first media item to an intermediate item, and finally to the second media item of interest, in this example item $m_p$. Any number of intermediate items can be traversed in this manner, which we call a transitive technique. The list of similarity values M(i, i+1), M(i+1, i+2), ..., M(i+k, j) between pairs of media items along this path through the graph are combined in a manner such that the resulting value satisfies a definition of similarity between media item i and media item j appropriate for the application. For example, the similarity M(i,j) might be computed as:

$$M(i,j) = \min\{M(i,i+1), M(i,i+2), \ldots, M(i+k,j)\}$$

or $$M(i,j) = M(i,i+1) * M(i,i+2) * \ldots * M(i+k,j)$$

Other methods for computing a similarity value M(i,j) for the path between a first media item i and a second, non-adjacent media item j where the edges are labeled with the sequence of similarity values M(i, i+1), M(i+1, i+2), ..., M(i+k, j) can be used. From the user standpoint, this corresponds to determining an association metric for a pair of items that do not appear within the same mediaset.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. Therefore, it is to be understood that the invention is not to be limited to the specific embodiments disclosed and that modifications and other embodiments are intended to be included within the scope of the appended claims. For example, one of ordinary skill in the art will understand various aspects of the embodiments disclosed herein could be used in any system for building and sharing a composite playlist from collective group tastes on multiple media playback devices.

The scope of the present invention should, therefore, be determined only by the following claims.

The invention claimed is:

1. A system for building a composite playlist comprising:
   a server;

a plurality of session managers, each of the plurality of session managers associated with at least one of a plurality of media devices to yield associated media devices, wherein each of the plurality of session managers is configured to manage a status of one or more of the associated media devices, and wherein the plurality of session managers are configured to verify eligibility of the associated media devices to participate in a session;

a playlist builder software component executable on the server configured for receiving user media item data from each of the plurality of media devices and for building a composite playlist of media data items from the user media item data;

a plurality of playlist managers, each of the plurality of playlist managers associated with one of the plurality of media devices, wherein each of the plurality of playlist managers is configured to communicate with the playlist builder software component to send the user media item data of a corresponding media device to the playlist builder software component, wherein the playlist builder software component is further defined to send the media data items identified on the composite playlist to the plurality of playlist managers, and wherein the user media item data for each of the plurality of media devices is analyzed by the playlist builder software component to generate a playlist for each of the plurality of media devices to yield a generated playlist representing a media taste of a corresponding user;

a recommender software component executable on the server, wherein the recommender software component is configured to access the playlist builder software component to generate a recommended mediaset responsive to the generated playlist for each of the plurality of media devices; and an aggregator software component executable on the server, wherein the aggregator software component is configured to access the playlist builder to additively generate a composite recommended mediaset responsive to the recommended mediaset generated for each of the plurality of media devices by selectively adding media data items from a plurality of the recommended mediasets, wherein media data items are selected for inclusion in the composite recommended mediaset based on a utility function that maximizes the number of users with media taste reflected in the composite recommended mediaset.

2. The system of claim 1, wherein the user media item data comprises metadata that identifies a playlist of playable media files.

3. The system of claim 1, wherein each of the plurality of playlist managers is further configured to play the media data items identified on the composite playlist that are stored on at least one of the associated media devices.

4. The system of claim 1, wherein each of the plurality of playlist managers is configured to stream media files to other media players participating in the session.

5. The system of claim 4, wherein the system is configured such that each of the media data items listed in the composite playlist is stored on at least one of the plurality of media devices participating in the session, and wherein each of the media data items on the composite playlist is played at least substantially simultaneously on each of the media devices participating in the session by streaming of the stored media data item from the at least one of the plurality of media devices to each other one of the plurality of media devices participating in the session.

6. A computer-implemented method for building a composite playlist comprising:

defining, at a server, a plurality of session managers, each of the plurality of session managers associated with at least one of a plurality of media devices to yield associated media devices, wherein each of the plurality of session managers is configured to manage a status of one or more of the associated media devices, and wherein the plurality of session managers are configured to verify eligibility of the associated media devices to participate in a session;

receiving, via a playlist builder software component executable on the server, user media item data from each of the plurality of media devices and for building a composite playlist of media data items from the user media item data;

defining, at the server, a plurality of playlist managers, each of the plurality of playlist managers associated with one of the plurality of media devices, wherein each of the plurality of playlist managers is configured to communicate with the playlist builder software component to send the user media item data of a corresponding media device to the playlist builder software component, wherein the playlist builder software component is further defined to send the media data items identified on the composite playlist to the plurality of playlist managers, and wherein the user media item data for each of the plurality of media devices is analyzed by the playlist builder software component to generate a playlist for each of the plurality of media devices to yield a generated playlist representing a media taste of a corresponding user;

accessing, via a recommender software component executable on the server, the playlist builder software component to generate a recommended mediaset responsive to the generated playlist for each of the plurality of media devices; and accessing, via an aggregator software component executable on the server, the playlist builder to additively generate a composite recommended mediaset responsive to the recommended mediaset generated for each of the plurality of media devices by selectively adding media data items from a plurality of the recommended mediasets, wherein media data items are selected for inclusion in the composite recommended mediaset based on a utility function that maximizes the number of users with media taste reflected in the composite recommended mediaset.

7. The computer-implemented method of claim 6, wherein the user media item data comprises metadata that identifies a playlist of playable media files.

8. The computer-implemented method of claim 6, wherein each of the plurality of playlist managers is further configured to play the media data items identified on the composite playlist that are stored on at least one of the associated media devices.

9. The computer-implemented method of claim 6, wherein each of the plurality of playlist managers is configured to stream media files to other media players participating in the session.

10. The computer-implemented method of claim 9, wherein each of the media data items listed in the composite playlist is stored on at least one of the plurality of media devices participating in the session, and wherein each of the media data items on the composite playlist is played at least substantially simultaneously on each of the media devices participating in the session by streaming of the stored media data item from the at least one of the plurality of media devices to each other one of the plurality of media devices participating in the session.

11. A non-transitory computer-readable medium, having stored therein on a plurality of instructions for causing a computing device to execute a method for building a composite playlist, the plurality of instructions comprising code sections for:

defining a plurality of session managers, each of the plurality of session managers associated with at least one of a plurality of media devices to yield associated media devices, wherein each of the plurality of session managers is configured to manage a status of one or more of the associated media devices, and wherein the plurality of session managers are configured to verify eligibility of the associated media devices to participate in a session;

providing a playlist builder software component configured for receiving user media item data from each of the plurality of media devices and for building a composite playlist of media data items from the user media item data;

defining, a plurality of playlist managers, each of the plurality of playlist managers associated with one of the plurality of media devices, wherein each of the plurality of playlist managers is configured to communicate with the playlist builder software component to send the user media item data of a corresponding media device to the playlist builder software component, wherein the playlist builder software component is further defined to send the media data items identified on the composite playlist to the plurality of playlist managers, and wherein the user media item data for each of the plurality of media devices is analyzed by the playlist builder software component to generate a playlist for each of the plurality of media devices to yield a generated playlist representing a media taste of a corresponding user;

providing a recommender software component, wherein the recommender software component is configured to access the playlist builder software component to generate a recommended mediaset responsive to the generated playlist for each of the plurality of media devices; and providing an aggregator software component, wherein the aggregator software component is configured to access the playlist builder to additively generate a composite recommended mediaset responsive to the recommended mediaset generated for each of the plurality of media devices by selectively adding media data items from a plurality of the recommended mediasets, wherein media data items are selected for inclusion in the composite recommended mediaset based on a utility function that maximizes the number of users with media taste reflected in the composite recommended mediaset.

12. The non-transitory computer-readable medium of claim 11, wherein the user media item data comprises metadata that identifies a playlist of playable media files.

13. The non-transitory computer-readable medium of claim 11, wherein each of the plurality of playlist managers is further configured to play the media data items identified on the composite playlist that are stored on at least one of the associated media devices.

14. The non-transitory computer-readable medium of claim 11, wherein each of the plurality of playlist managers is configured to stream media files to other media players participating in the session.

15. The non-transitory computer-readable medium of claim 14, wherein each of the media data items listed in the composite playlist is stored on at least one of the plurality of media devices participating in the session, and wherein each of the media data items on the composite playlist is played at least substantially simultaneously on each of the media devices participating in the session by streaming of the stored media data item from the at least one of the plurality of media devices to each other one of the plurality of media devices participating in the session.

\* \* \* \* \*